United States Patent [19]

Hori et al.

[11] Patent Number: 4,834,052

[45] Date of Patent: May 30, 1989

[54] INTERNAL COMBUSTION ENGINE HAVING AIR/FUEL MIXTURE WITH ANTI-REDUCING SEMICONDUCTING PORCELAIN HAVING A POSITIVE TEMPERATURE COEFFICIENT OF RESISTANCE AND METHOD FOR USING SUCH PORCELAIN FOR HEATING AIR/FUEL MIXTURE

[75] Inventors: Makoto Hori, Ougaki; Hitoshi Niwa; Hirokatsu Mukai, both of Okazaki; Toshiatsu Nagaya, Kariya; Naoto Miwa, Tsushima; Itsuhei Ogata, Kariya, all of Japan

[73] Assignee: Nippondenso Co., Ltd., Kariya, Japan

[21] Appl. No.: 96,242

[22] Filed: Sep. 8, 1987

Related U.S. Application Data

[62] Division of Ser. No. 809,176, Dec. 16, 1985, abandoned.

[30] Foreign Application Priority Data

| Dec. 26, 1984 | [JP] | Japan | 59-281418 |
| Aug. 21, 1985 | [JP] | Japan | 60-183471 |
| Sep. 2, 1985 | [JP] | Japan | 60-193643 |
| Sep. 2, 1985 | [JP] | Japan | 60-193642 |

[51] Int. Cl.$^4$ ............................. F02M 31/12
[52] U.S. Cl. ................... 123/549; 501/139; 123/557
[58] Field of Search ........... 123/549, 557; 501/139, 501/137, 138; 252/520, 521

[56] References Cited

U.S. PATENT DOCUMENTS

| 3,586,642 | 6/1971 | Matsuo et al. | 501/139 |
| 3,975,307 | 8/1976 | Matsuo et al. | 252/520 |
| 4,571,481 | 2/1986 | Leary | 123/557 |
| 4,593,670 | 6/1986 | Nara et al. | 123/549 |

FOREIGN PATENT DOCUMENTS

| 0021876 | 6/1974 | Japan | 501/139 |
| 0012919 | 4/1977 | Japan | 501/137 |
| 0095673 | 7/1980 | Japan | 501/139 |
| 2013649 | 8/1979 | United Kingdom | 501/137 |

OTHER PUBLICATIONS

H. Niwa et al., "Development of PTC Element", *JSAE Review*, Aug. 1985, pp. 95–98.

T. Matsuoka et al., "PTCR Behavior of BaTiO$_3$ with Nb$_2$O$_5$ and MnO$_2$ Additives", Journal of the American Ceramic Society, vol. 55, No. 2, Feb. 1972, p. 108.

O. Saburi, "Semiconducting Bodies in the Family of Barium Titanates", Journal of the American Ceramic Society, vol. 44, No. 2, Feb. 1961, pp. 54–63.

Chemical Abstracts, vol. 95, No. 5, Sep. 1981, p. 612, abstract No. 90037f, Columbus, Ohio.

American Ceramic Society Bulletin, vol. 47, No. 3, Mar. 1968, pp. 292–297, Columbus, Ohio.

*Primary Examiner*—Willis R. Wolfe
*Assistant Examiner*—M. Macy
*Attorney, Agent, or Firm*—Cushman, Darby & Cushman

[57] ABSTRACT

Anti-reducing semiconducting porcelain having a positive temperature coefficient of resistance comprises a barium titanate composition, and a flux containing 0.14 to 2.88 parts by weight of TiO$_2$, 0.1 to 1.6 parts by weight of Al$_2$O$_3$ and 0.1 to 1.6 parts by weight of SiO$_2$ per 100 parts by weight of the barium titanate composition. It has a high positive temperature coefficient of resistance which does not show any appreciable change in the presence of a reducing atmosphere, such as hydrogen gas or gasified gasoline. It need not be isolated from a reducing atmosphere by a plastic or metallic enclosure, but can be exposed thereto. The flux may further contain a zinc, potassium or lithium compound.

15 Claims, 9 Drawing Sheets

INTERNAL COMBUSTION ENGINE HAVING AIR/FUEL MIXTURE WITH ANTI-REDUCING SEMICONDUCTING PORCELAIN HAVING A POSITIVE TEMPERATURE COEFFICIENT OF RESISTANCE AND METHOD FOR USING SUCH PORCELAIN FOR HEATING AIR/FUEL MIXTURE

This is a division of application Ser. No. 809,176, filed Dec. 16, 1985, now abandoned.

BACKGROUND OF THE INVENTION

1. Field of the Invention

This invention relates to semiconducting porcelain having a positive temperature coefficient of resistance, of which the electric resistance greatly increases at a temperature exceeding the Curie point. More particularly, it is directed to anti-reducing semiconducting porcelain which is principally employed to make heaters of the automatic termperature control type, temperature sensors, and other devices used in a reducing gas atmosphere.

2. Description of the Prior Art

It is known that the porcelain produced by firing a mixture of barium titanate with a rare earth element, such as Y, La, Sm, Ce or Ga, or a transition element, such as Nb or Ta, at a temperature of 1200° C. to 1400° C. in the air has a positive temperature coefficient of resistance, i.e., increases its electric resistance abruptly at the Curie point. This nature endures such porcelain useful for making heaters, temperature sensors, etc.

It is, however, also known that the semiconductor devices which are produced from positive coefficient semiconducting porcelain composed mainly of a barium titanate semiconductor have a lower positive temperature coefficient of resistance if they are used in a reducing atmosphere, such as an atmosphere containing hydrogen gas or gasoline. If such a semiconductor device is, for example, used in a heater of the automatic temperature control type, a lowering in its positive temperature coefficient of resistance results in the failure of its resistance to increase despite an elevation of its temperature to a predetermined level, and leads in the worst case to its damage by an electric current passing therethrough. It is also known that such a lowering in positive temperature coefficient of resistance occurs not only in a reducing atmosphere, but also in a neutral atmosphere, such as nitrogen or argon, even though to a smaller extent.

It has, therefore, been possible to use those semiconductor devices only in a limited environment. In the event such a device is used in a reducing atmosphere, it has been necessary to confine it in a plastic or metallic case to isolate it from its enviroment. The case prevents the device from releasing heat satisfactorily and working efficiently. The case adds to the number of the parts and the number of the manufacturing steps with a resultant increase of manufacturing cost.

SUMMARY OF THE INVENTION

First Aspect of the Invention

This invention is based on the discovery that a flux composed of $TiO_2$, $Al_2O_3$ and $SiO_2$ prevents semiconducting porcelain from having its positive temperature coefficient of resistance lowered in a reducing atmosphere.

The anti-reducing semiconducting porcelain having a positive temperature coefficient of resistance according to this invention comprises (I) 100 parts by weight of a barium titanate composition, and (II) a flux composition containing 0.14 to 2.88 parts by weight of $TiO_2$, 0.1 to 1.6 parts by weight of $Al_2O_3$ and 0.1 to 1.6 parts by weight of $SiO_2$.

The barium titanate which is used for making the porcelain of this invention is usually prepared from an equimolar mixture of barium carbonate ($BaCO_3$) and titanium oxide ($TiO_2$). It does, however, not always need to be prepared from an equimolar mixture, but may be a composition of general formula (1) or (2), depending on the purpose for which the porcelain is used:

  (1)

$$Ba_{1-x}M_x^3TiO_3 \qquad (1)$$

  (2)

$$BaTi_{1-y}M_y^5O_3 \qquad (2)$$

In these formulas, $M^3$ and $M^5$ are each a semiconductor making agent selected from the rare earth and transition elements, respectively. $M^3$ may be a rare earth element, such as Y, La, Sm, Ce or Ga, and $M^5$ may be a transition element, such as Nb or Ta. x and y are preferably from 0.001 to 0.005, and from 0.0005 to 0.005, respectively.

According to the most important feature of this invention, the porcelain contains a flux composed of 0.14 to 2.88 parts by weight of $TiO_2$, 0.1 to 1.6 parts by weight of $Al_2O_3$ and 0.1 to 1.6 parts by weight of $SiO_2$ per 100 parts by weight of a barium titanate composition. If the quantity of any of the flux consituents fails to fall within its range specified above, it is difficult to prevent the porcelain from having its positive temperature coefficient of resistance lowered in a reducing atmosphere. The porcelain tends to have a higher resistivity with an increase in the quantity of any flux constituent. In order to overcome this problem, it is preferable to limit the quantity of each flux constituent so that the porcelain may contain 0.14 to 1.15 parts by weight of $TiO_2$, 0.2 to 0.6 part by weight of $Al_2O_3$ and 0.2 to 0.8 part by weight of $SiO_2$ per 100 parts by weight of the barium titanate composition. If such is the case, the porcelain has a resistivity not exceeding 100 Ω.cm and is suitable for application to automobile parts.

The flux constituents are mixed with $BaCO_3$ and $TiO_2$ of which the barium titanate composition mainly consists, and the mixture is fired. It is important to add the flux constituents in the ranges of quantities hereinabove stated in order to produce good anti-reducing semiconducting porcelain having a positive temperature coefficient of resistance. If the proportions of the flux constituents relative to one another or the quantity of the flux as a whole is altered without bringing about any deviation from the ranges hereinabove specified, it is possible to produce various types of positive coefficient semiconducting porcelain having different degrees of crystal growth and thereby different grades of performance. If one or two of the flux constituent's are lacking, however, it is difficult to obtain a semiconductor having any satisfactory anti-reducing property, or a stable semiconductor having a positive temperature coefficient of resistance, as the material lacking one or two flux constituents is more easily influenced by the firing conditions, or the presence of impurities.

The porcelain of this invention may further contain a titanate such as strontium or lead titanate, a zirconate such as barium zirconate, or a stannate such as barium stannate. It may preferably contain a Curie point controller selected from elements, such as Pb, Sr, Zr and Sn. Moreover, it may preferably contain a very small amount of an element, such as Mn, Fe or Co, which improves its positive temperature coefficient of resistance.

The porcelain of this invention can be produced by a customary method including mixing, molding and firing. A semiconductor is formed by a process which will hereunder be described. Barium titanate is formed at a temperature of 800° C. to 1100° C., but its crystal lattices are still out of order. At a temperature of 1200° C. to 1280° C., a portion of the flux begins to melt and the barium titanate begins to grow rapidly into a semiconductor. If the flux is completely melted, the barium titanate particles form a semiconductor in the molten flux. The product of such firing is cooled and the molten flux covering the semiconductor particles of barium titanate solidifies to fix them.

Although the reason why the porcelain of this invention is anti-reducing is not clear, it is presumed that the flux covers the grain boundary of the barium titanate semiconductor and protects it from a reducing atmosphere. The porcelain of this invention has a water absorbing capacity of virtually 0%, while that of any known positive coefficient semiconducting porcelain is 0.2% or higher. Therefore, there is virtually no invasion of any reducing substance into the porcelain of this invention. This is presumably another reason for the anti-reducing nature of the porcelain according to this invention.

The porcelain of this invention has a high positive temperature coefficient of resistance which does not show any appreciable lowering even in the presence of a reducing atmosphere. It can be exposed to a reducing atmosphere, such as hydrogen gas or gasoline, and does not need to be confined in a plastic or metallic case. This enables a greater degree of freedom in product design, improved performance, and a reduction of production cost. The porcelain of this invention can be produced from inexpensive industrial materials by far more easily than any known positive coefficient semiconducting porcelain, since it is not easily influenced by impurities, firing conditions, or the quantity of the semiconductor forming agent employed.

Second Aspect of the Invention

According to a second aspect of this invention, there is provided anti-reducing semiconducting porcelain having a positive temperature coefficient of resistance, comprising (I) a barium titanate composition, and (II) a flux composed of 0.2 to 1.6 parts by weight of alumina ($Al_2O_3$), 0.14 to 2.88 parts by weight of titanium dioxide ($TiO_2$) and 0.1 to 1.6 parts by weight of silicon dioxide ($SiO_2$) per 100 parts by weight of the barium titanate composition and further containing a zinc compound having a zinc content of 0.05 to 0.5 mol per 100 mols of the barium titanate composition.

The barium titanate composition is identical to what has hereinabove been described with reference to the first aspect of this invention.

The most important feature of this invention is that the flux is composed of 0.2 to 1.6 parts by weight of $Al_2O_3$, 0.14 to 2.88 parts by weight of $TiO_2$ and 0.1 to 1.6 parts by weight of $SiO_2$ per 100 parts by weight of the barium titanate composition and further contains a zinc compound having a zinc content of 0.05 to 0.5 mol per 100 mols of the barium titanate composition. No shortage or excess of any of the flux constituents is desirable. The porcelain tends to have a higher resistivity with an increase in the quantity of any flux constituent. In order to overcome this problem, it is preferable to limit the quantity of each flux constituent so that the flux may be composed of 0.2 to 0.4 parts by weight of $Al_3O_3$, 0.14 to 1.15 parts by weight of $TiO_2$ and 0.2 to 0.8 part by weight of $SiO_2$ per 100 parts by weight of the barium titanate compositin and further contain a zinc compound having a zinc content of 0.05 to 0.2 mol per 100 mols of the barium titanate composition. If such is the case, the porcelain usually has a resistivity not exceeding 100 $\Omega$.cm and is suitable for application to automobile parts.

Zinc oxide (ZnO) is usually used as one of the flux constituents, but does not preclude the use of any other zinc compound that can be incorporated into the porcelain under specific sintering conditions. Therefore, it is possible to use, for example, zinc carbonate ($ZnCO_3$), zinc nitrate [$Zn(NO_3)_2$], zinc chloride ($ZnCl_2$), zinc oxalate [$Zn(C_2O_4)$] or zinc fluoride ($ZnF_2$), or a mixture thereof. While the majority of these compounds form zinc oxide during calcining or firing, it is possible to use a compound not forming zinc oxide under certain firing conditions (e.g., $ZnF_2$), or a compound which is only partly converted to zinc oxide. It is usually appropriate to use ZnO or $ZnCO_3$.

The same is true of the other flux constituents, $Al_2O_3$, $TiO_2$ and $SiO_2$. It is not always necessary to start with oxides, but is possible to employ any other compounds if they form $Al_2O_3$, $TiO_2$ and $SiO_2$, respectively, in the porcelain when fired. Therefore, it is possible to use, for example, hydroxides of aluminum, titanium and silicon.

The flux constituents are mixed with $BaCO_3$ and $TiO_2$ of which the barium titanate composition will be composed mainly, and the mixture is fired. It is important to employ all of the flux constituents in the ranges of quantities hereinabove stated in order to produce highly anti-reducing semiconducting porcelain having a positive temperature coefficient of resistance. If the proportions of the flux constituents relative to one another or the quantity of the flux as a whole is altered without bringing about any deviation from the ranges hereinabove specified, it is possible to produce various types of positive coefficient semiconducting porcelain having different degrees of crystal growth and thereby different grades of performance.

The porcelain of this invention may further contain, for example, a titanate such as strontium or lead titanate, a zirconate such as barium zirconate, or a stannate such as barium stannate. As regards a compound containing lead, it is better from the standpoint of the anti-reducing property of the porcelain to add it to form a solid solution with $BaTiO_3$ during calcining than during firing.

It is also preferable to add a Curie point controller selected from elements, such as Pb, Sr, Zr and Sn. Moreover, it is preferable to add a very small amount of an element, such as Mn, Fe or Co, in order to improve the porcelain in its positive temperature coefficient of resistance.

The porcelain of this invention can be produced by a customary method including mixing, molding and firing, as has hereinbefore been described with reference to the first aspect of this invention.

The porcelain of this invention has a water absorbing capacity of virtually 0% not exceeding about 0.01% by weight, while that of any known positive coefficient semiconducting porcelain is about 0.5% by weight. Therefore, there is virtually no invasion of any reducing substance into the porcelain of this invention. This is presumably one of the reasons why the porcelain of this invention is anti-reducing.

The porcelain of this invention has a high positive temperature coefficient of resistance which does not show any appreciable lowering even in the presence of a reducing atmosphere. Therefore, it is not only useful in the presence of a neutral atmosphere, such as nitrogen or carbon dioxide. It can be exposed to even a reducing atmosphere, such as hydrogen gas or gasoline, and does not need to be confined in a plastic or metallic case. This enables improved performance, a greater degree of freedom in product design, and a reduction of production cost.

The porcelain of this invention can be produced from inexpensive industrial materials by far more easily than any known positive coefficient semiconducting porcelain, since it is not easily influenced by impurities, firing conditions, or the quantity of the semiconductor forming agent employed.

Thus, the porcelain of this invention is applicable to a variety of products including automobile parts, such as air or fuel heaters and temperature sensors.

Third Aspect of the Invention

According to a third aspect of this invention, there is provided anti-reducing semiconducting porcelain having a positive tmeperature coefficient of resistance, comprising (I) a barium titanate composition, and (II) a flux composed of 0.2 to 1.6 parts by weight of alumina ($Al_2O_3$), 0.14 to 2.88 parts by weight of titanium dioxide ($TiO_2$) and 0.1 to 1.6 parts by wight of silicon dioxide ($SiO_2$) per 100 parts by weight of the barium titanate composition and further containing a potassium compound having a potassium content of 0.01 to 0.6 mol per 100 mols of the barium titanate composition.

As regards the barium titanate composition, reference is made to the relevant description of the porcelain according to the first aspect of this invention.

The most important feature of this invention is that the flux contains a potassium compound in addition to alumina, titanium dioxide and silicon dioxide. More specifically, the flux is composed of 0.2 to 1.6 parts by weight of $Al_2O_3$, 0.14 to 2.88 parts by weight of $TiO_2$ and 0.1 to 1.6 parts by weight of $SiO_2$ per 100 parts by weight of the barium titanate composition and further contains a potassium compound having a potassium content of 0.01 to 0.6 mol per $\phi$mols of the barium titanate composition. No shortage or excess of any of the flux constituents is desirable. The porcelain tends to have a higher resistivity with an increase in the quantity of any flux constituent. In order to overcome this problem, it is preferable to limit the quantity of each flux constituent so that the flux may contain 0.2 to 0.4 part by weight of $Al_2O_3$, 0.14 to 1.15 parts by weight of $TiO_2$ and 0.2 to 0.8 part by weight of $SiO_2$ per 100 parts by weight of the barium titanate composition, and a potassium compound having a potassium content of 0.01 to 0.2 mol per 100 mols of the barium titanate composition. If such is the case, the porcelain has a resistivity not exceeding about 200 $\Omega$.cm, and in the majority of the cases, even not exceeding 100 $\Omega$.cm, and is suitable for application to automobile parts.

Potassium oxide ($K_2O$) is usually used as the potassium compound forming one of the flux constituents, but does not preclude the use of any other potassium compound that can be incorporated into the porcelain under specific sintering conditions. Therefore, it is possible to use also, for example, potassium carbonate ($K_2CO_3$), potassium nitrate ($KNO_3$), potassium chloride (KCl) or potassium hydroxide (KOH), or a mixture thereof. While the majority of these compounds apparently form $K_2O$ during calcining or firing, it is possible to use also a compound not forming $K_2O$ under certain firing conditions, or a compound which is only partly converted to $K_2O$. It is usually appropriate to use $K_2CO_3$ or $KNO_3$.

The description concerning the second aspect of the invention, page 8, line 23 to page 11, line 6, is equally applicable to the third aspect of this invention.

Fourth Aspect of the Invention

According to a fourth aspect of this invention, there is provided anti-reducing semiconducting porcelain having a positive temperature coefficient of resistance, comprising (I) a barium titanate composition, and (II) a flux composed of 0.2 to 1.6 parts by weight of alumina, 0.14 to 2.88 parts by weight of titanium dioxide and 0.1 to 1.6 parts by weight of silicon dioxide per 100 parts by weight of the barium titanate composition, and further containing a lithium compound having a lithium content of 0.04 to 2.0 mols per 100 mols of the barium titanate composition.

As regards the barium titanate composition, reference is made to the relevant description of the porcelain according to the first aspect of this invention.

The most important feature of the porcelain according to the fourth aspect of this invention is that the flux contains a lithium compound in addition to alumina, titanium dioxide and silicon dioxide. More specifically, the flux contains 0.2 to 1.6 parts by weight of $Al_2O_3$, 0.14 to 2.88 parts by weight of $TiO_2$ and 0.1 to 1.6 parts by weight of $SiO_2$ per 100 parts by weight of the barium titanate composition, and a lithium compound having a lithium content of 0.04 to 2.0 mols per 100 mols of the barium titanate composition. No shortage or excess of any of the flux constituents is desirable. The porcelain tends to have a higher resistivity with an increase in the quantity of any flux consituent. In order to overcome this problem, it is preferable to limit the quantity of each flux constituent so that the flux may contain 0.2 to 0.4 part by weight of $Al_2O_3$, 0.14 to 1.15 parts by weight of $TiO_2$ and 0.2 to 0.8 part by weight of $SiO_2$ per 100 parts by weight of the barium titanate composition, and a lithium compound having a lithium content of 0.1 to 0.8 mol per 100 mols of the barium titanate composition. If such is the case, the porcelain has a resistivity not exceeding 80 $\Omega$.cm and is suitable for application to automobile parts.

Lithium oxide ($Li_2O$) is usually used as the lithium compound forming one of the flux constituents, but does not preclude the use of any other lithium compound that can be incorporated into the porcelain under specific sintering conditions. Therefore, it is also possible to use, for example, lithium carbonate ($Li_2CO_3$), lithium nitrate ($LiNO_3$), lithium chloride (LiCl), lithium hydroxide (LiOH), or a mixture thereof. While the majority of these compounds apparently form $Li_2O$ during calcining or firing, it is also possible to use a compound not forming $Li_2O$ under certain firing conditions, or a compound which is only partly converted to $Li_2O$. It is usually appropriate to use $Li_2CO_3$ or $Li_2O$.

The description concerning the second aspect of the invention is equally applicable to the fourth aspect of this invention.

DETAILED DESCRIPTION OF PREFERRED EMBODIMENTS

Figure 1:
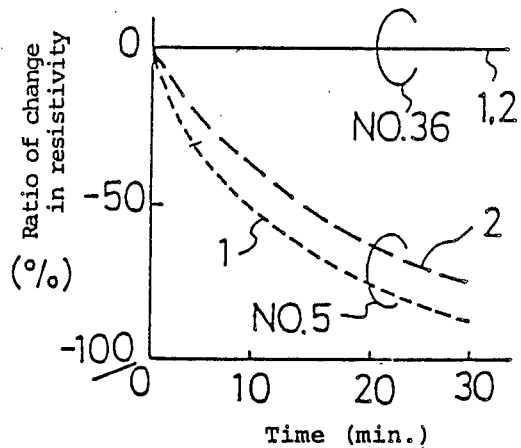
FIG. 1 is a graph showing changes of electric resistance in hydrogen and propane gas.

The invention will now be described more specifically with reference to a plurality of examples according to each of the first to fourth aspects thereof.

First Aspect of the Invention:

EXAMPLE 1

An equimolar mixture of $BaCO_3$ and $TiO_2$, $TiO_2$, $Al_2O_3$ and $SiO_2$ were prepared in accordance with the 60 recipes shown in TABLES 1 to 3. All of them had been selected from industrial materials. They and agate were ground and mixed in a wet ball mill for 20 hours. After each mixture had been dried, it was calcined at a temperature of 900° C. to 1200° C. After additives, such as Mn, had been added to the calcined product, it and agate were ground and mixed in a wet ball mill for 20 hours. After the mixed powder had been dried, 1% by weight of a 10% aqueous solution of polyvinyl alcohol was added thereto as a binder, and the mixture was press molded at a pressure of 800 kg/cm². The molded product was fired at a temperature of 1200° C. to 1400° C. for two hours in the air to yield a 20 mm dia., 3 mm thick disk of semiconducting porcelain having a positive temperature coefficient of resistance.

The 60 disks of porcelain which had been obtained were examined for its properties. A Ni-Ag electrode was formed on each side of each disk by the electroless plating of Ni and the application of a paste of Ag, and its electric resistance (resistivity $R_0$) was measured at 25° C. in the air. The results are shown in TABLE 1, 2 or 3. Each disk was also placed in a hydrogen gas atmosphere, and its resistances $R_1$ and $R_2$ were measured at 250° C. immediately after it had been placed in the hydrogen gas atmosphere, and 30 minutes thereafter, respectively. A ratio of change in resistance ($\Delta R$) was calculated by equation (3):

$$\Delta R = 100 \times (R_2 - R_1)/R_1 \qquad (3)$$

As $R_2$ approaches $R_1$, or as $\Delta R$ approaches zero, the porcelain is improved in anti-reducing property.

The results are shown in TABLE 1, 2 or 3. In TABLES 1 to 3, the three marks of evaluation, 'circle', 'triangle' and 'cross', indicate that $\Delta R$ was from 0 to 10%, from −10 to −50%, and over −50%, respectively. Although Samples Nos. 1 and 11 to 13 are shown in TABLE 1 as containing zero part by weight of $TiO_2$, they are so shown, since they contain only a very small amount of $TiO_2$ (less than 0.14 part by weight).

TABLE 1

| | Barium titanate Composition $BaCO_3TiO_2$ 50/50 mol % | Flux $TiO_2$ Parts by weight | Flux $Al_2O_3$ Parts by weight | Flux $SiO_2$ Parts by weight | Properties Resistivity Ωcm | Anti-reducing property $\Delta R$ % | Anti-reducing property Evaluation |
|---|---|---|---|---|---|---|---|
| No | | | | | | | |
| 1 | 100 Parts by weight | 0 | 0.8 | 11 | −62 | X | |
| 2 | ↑ | 0.14 | ↑ | ↑ | 9 | −87 | X |
| 3 | ↑ | 0.59 | | 0.2 | 14 | −71 | X |
| 4 | ↑ | ↑ | | 0.4 | 13 | −54 | X |
| 5 | ↑ | ↑ | | 0.8 | 12 | −82 | X |
| 6 | ↑ | ↑ | | 1.6 | 44 | −61 | X |
| 7 | ↑ | 2.31 | | 0.8 | 46 | −81 | X |
| 8 | ↑ | 0.59 | 0.4 | | 4.8k | −68 | X |
| 9 | ↑ | ↑ | 0.8 | | 63k | −76 | X |
| 10 | ↑ | ↑ | 1.6 | | ∞ | — | — |
| 11 | ↑ | ↑ | 0.2 | 0.6 | 13 | −21 | Δ |
| 12 | ↑ | ↑ | 0.4 | 0.4 | 17 | −16 | Δ |
| 13 | ↑ | ↑ | 0.6 | 0.2 | 210 | −22 | Δ |
| 14 | ↑ | 0.14 | 0.2 | 0.2 | 13 | −3.4 | O |
| 15 | ↑ | ↑ | ↑ | 0.6 | 14 | −14 | Δ |
| 16 | ↑ | ↑ | 0.4 | 0.4 | 15 | −0.5 | O |
| 17 | ↑ | ↑ | 0.6 | 0.2 | 95 | −4.6 | O |
| 18 | ↑ | ↑ | 0.8 | 0.8 | 320 | −14 | Δ |
| 19 | ↑ | 0.29 | 0.2 | 0.2 | 12 | −5.2 | O |
| 20 | ↑ | ↑ | ↑ | 0.6 | 12 | −8 | O |

TABLE 2

| No | Barium titanate composition | Flux TiO$_2$ | Al$_2$O$_3$ | SiO$_2$ | Resistivity | Anti-reducing property ΔR | Evaluation |
|---|---|---|---|---|---|---|---|
| 21 | ↑ | ↑ | 0.4 | 0.4 | 18 | −1.6 | O |
| 22 | ↑ | ↑ | 0.6 | 0.2 | 88 | −2.3 | O |
| 23 | ↑ | ↑ | 0.8 | 0.8 | 270 | −24 | Δ |
| 24 | ↑ | 0.59 | 0.1 | 0.1 | 45 | −36 | Δ |
| 25 | ↑ | ↑ | ↑ | 0.2 | 15 | −35 | Δ |
| 26 | ↑ | ↑ | ↑ | 0.4 | 13 | −12 | Δ |
| 27 | ↑ | ↑ | ↑ | 0.8 | 13 | −31 | Δ |
| 28 | ↑ | ↑ | ↑ | 1.6 | 38 | −49 | Δ |
| 29 | ↑ | ↑ | 0.2 | 0.1 | 96 | −12 | Δ |
| 30 | ↑ | ↑ | ↑ | 0.2 | 16 | −2.8 | O |
| 31 | ↑ | 0.59 | 0.2 | 0.4 | 16 | −7.6 | O |
| 32 | ↑ | ↑ | ↑ | 0.8 | 17 | −9.9 | O |
| 33 | ↑ | ↑ | ↑ | 1.6 | 44 | −18 | Δ |
| 34 | ↑ | ↑ | 0.4 | 0.1 | 112 | −9.1 | O |
| 35 | ↑ | ↑ | ↑ | 0.2 | 20 | −0.5 | O |
| 36 | ↑ | ↑ | ↑ | 0.4 | 16 | 0 | O |
| 37 | ↑ | ↑ | ↑ | 0.8 | 49 | −4.2 | O |
| 38 | ↑ | ↑ | ↑ | 1.6 | 206 | −21 | Δ |
| 39 | ↑ | ↑ | 0.8 | 0.1 | 12k | −11 | Δ |
| 40 | ↑ | ↑ | ↑ | 0.2 | 6.4k | −19 | Δ |

TABLE 3

| No | Barium titanate composition | Flux TiO$_2$ | Al$_2$O$_3$ | SiO$_2$ | Resistivity | Anti-reducing property ΔR | Evaluation |
|---|---|---|---|---|---|---|---|
| 41 | ↑ | ↑ | ↑ | 0.4 | 860 | −2.9 | O |
| 42 | ↑ | ↑ | ↑ | 0.8 | 170 | −8.3 | O |
| 43 | ↑ | ↑ | ↑ | 1.6 | 16k | −32 | Δ |
| 44 | ↑ | ↑ | 1.6 | 0.1 | ∞ | — | — |
| 45 | ↑ | ↑ | ↑ | 0.2 | 360k | −8.7 | O |
| 46 | ↑ | ↑ | ↑ | 0.4 | 16k | −21 | Δ |
| 47 | ↑ | ↑ | ↑ | 0.8 | 2.4k | −45 | Δ |
| 48 | ↑ | ↑ | ↑ | 1.6 | ∞ | — | — |
| 49 | ↑ | 1.15 | 0.2 | 0.2 | 44 | −6.2 | O |
| 50 | ↑ | ↑ | ↑ | 0.6 | 28 | 0 | O |
| 51 | ↑ | ↑ | 0.4 | 0.4 | 26 | −0.6 | O |
| 52 | ↑ | ↑ | 0.6 | 0.2 | 80 | −2.1 | O |
| 53 | ↑ | ↑ | 0.8 | 0.8 | 245 | −11 | Δ |
| 54 | ↑ | 2.31 | 0.2 | 0.2 | 161 | −7.9 | O |
| 55 | ↑ | ↑ | ↑ | 0.6 | 153 | −6.0 | O |
| 56 | ↑ | ↑ | 0.4 | 0.4 | 262 | −1.1 | O |
| 57 | ↑ | ↑ | 0.6 | 0.2 | 611 | −7.1 | O |
| 58 | ↑ | ↑ | 0.8 | 0.8 | 1.6k | −36 | Δ |
| 59 | ↑ | 2.88 | 0.2 | 0.6 | 246 | −49 | Δ |
| 60 | ↑ | ↑ | 0.4 | 0.4 | 221 | −33 | Δ |

TABLE 1 confirms the excellent anti-reducing property of the samples of porcelain according to this invention containing 0.14 to 2.88 parts by weight of TiO$_2$, 0.1 to 1.6 parts by weight of Al$_2$O$_3$ and 0.1 to 1.6 parts by weight of SiO$_2$ per 100 parts by weight of the equimolar mixture of BaCO$_3$ and TiO$_2$ (Nos. 11 to 60), as compared with the other samples (Nos. 1 to 10), since they (Nos. 11 to 60) have a ratio ΔR which is not lower than −49%. The samples which are preferable in the quantities of the flux constituents, i.e., contain 0.14 to 1.15 parts by weight of TiO$_2$, 0.2 to 0.6 part by weight of Al$_2$O$_3$ and 0.2 to 0.8 part by weight of SiO$_2$, are particularly high in anti-reducing property and suitable for application to automobile parts, as they have a resistivity (R$_0$) which is lower than 100 Ω.cm, and a ratio ΔR which is not lower than −14% (Nos. 14 to 17, 19 to 22, 30 to 32, 35 to 37 and 49 to 52).

EXAMPLE 2

Figure 2:
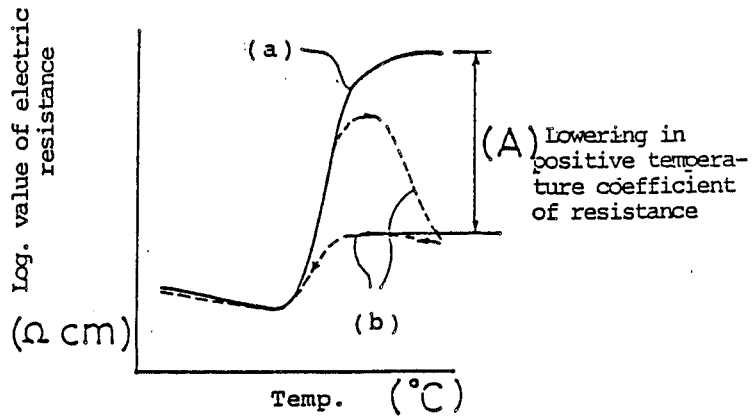
FIG. 2 is a graph showing a positive temperature coefficient of resistance lowered in gasoline.

The procedure of EXAMPLE 1 were repeated for preparing 20 mm dia., 3 mm thick disks of positive coefficient semiconducting porcelain by mixing, molding and firing the materials in accordance with the same recipes, and forming a Ni-Ag electrode on each side of each disk. The electric resistance of each disk was measured substantially continuously over a temperature range from the ambient temperature to 300° C. The results are shown by a solid-line curve (a) in FIG. 2. Then, each disk was subjected to an immersion voltage withstanding test. The test was conducted by immersing the disk in sour gasoline and applying a voltage of 15 to 40 V thereto for 100 hours. The sour gasoline is a type of gasoline which has been oxidized to form a peroxide or an acid, and which is used for an accelerated test. After the test had been over, the electric resistance of each disk was measured substantially continuously over a temperature range from the ambient temperature to 300° C. The results are shown by a broken-line curve (b) in FIG. 2. A lowering in its positive temperature coefficient of resistance was obtained by comparing the two curves, and is shown at (A) in FIG. 2. The numerical data on such lowering are given in TABLE 4. The lowering (A) was calculated by the following equation:

Lowering $(A) = \log(R'\text{max.}/R'\text{min.}) - \log(R\text{max.}/R\text{min.})$ where R is the resistance measured before the withstanding test, R' is the resistance measured after the withstanding test, max. is the maximum value, and min. is the minimum value.

TABLE 4 does not show data on certain samples, since no immersion voltage withstanding test was conducted on any sample of porcelain having a resistivity exceeding 100 Ω.cm, as any such porcelain fails to produce a sufficiently large amount of heat during such a test to provide reliable data. The evaluation marks, 'circle', 'triangle' and 'cross', in TABLE 4 indicate that the absolute value of (A) is within 1, from 1 to 2, and over 2, respectively.

TABLE 4

| No. | Lowering in positive temperature coefficient of resistance | Evaluation |
|---|---|---|
| 1 | −4.1 | X |
| 2 | −4.3 | X |
| 3 | −4.3 | X |
| 4 | −4.0 | X |
| 5 | −4.5 | X |
| 6 | −4.1 | X |
| 7 | −4.4 | X |
| 8 | — | — |
| 9 | — | — |
| 10 | — | — |
| 11 | −1.6 | Δ |
| 12 | −0.9 | O |
| 13 | — | — |
| 14 | −0.1 | O |
| 15 | −0.8 | O |
| 16 | +0.2 | O |
| 17 | −0.4 | O |
| 18 | — | — |
| 19 | −0.2 | O |
| 20 | −0.3 | O |
| 21 | +0.2 | O |

TABLE 4-continued

| No. | Lowering in positive temperature coefficient of resistance | Evaluation |
| --- | --- | --- |
| 22 | −0.1 | O |
| 23 | — | — |
| 24 | −1.9 | Δ |
| 25 | −1.8 | Δ |
| 26 | −0.7 | O |
| 27 | −2.6 | X |
| 28 | −2.8 | X |
| 29 | −0.8 | O |
| 30 | −0.1 | O |
| 31 | −0.7 | O |
| 32 | −0.6 | O |
| 33 | −1.8 | Δ |
| 34 | — | — |
| 35 | +0.4 | O |
| 36 | +0.2 | O |
| 37 | ±0 | O |
| 38 | — | — |
| 39 | — | — |
| 40 | — | — |
| 41 | — | — |
| 42 | — | — |
| 43 | — | — |
| 44 | — | — |
| 45 | — | — |
| 46 | — | — |
| 47 | — | — |
| 48 | — | — |
| 49 | −0.3 | O |
| 50 | +0.2 | O |
| 51 | +0.1 | O |
| 52 | ±0 | O |
| 53 | — | — |
| 54 | — | — |
| 55 | — | — |
| 56 | — | — |
| 57 | — | — |
| 58 | — | — |
| 59 | — | — |
| 60 | — | — |

TABLE 4 shows that the logarithmic value indicating the change in the positive temperature coefficient of resistance of the samples of porcelain according to this invention (Nos. 11 to 60) was as small as −2.8 to +0.4, and that they are, therefore, excellent in anti-reducing property, as compared with the other samples (Nos. 1 to 10). The samples which are preferable in the quantities of the flux constituents, i.e., contain 0.14 to 1.15 parts by weight of $TiO_2$, 0.2 to 0.6 part by weight of $Al_2O_3$ and 0.2 to 0.8 part by weight of $SiO_2$, among others, have an excellent anti-reducing property, as the values indicating the change in their positive temperature coefficient of resistance are within plus or minus 1.

EXAMPLE 3

The procedures of EXAMPLE 1 were repeated for preparing two 20 mm dia., 3 mm thick disks of semiconducting porcelain. One of them was identical to Sample No. 5 according to the prior art, and the other was identical to Sample No. 36 according to this invention. A Ni-Ag electrode was formed on each side of each disk and the disk was left at 250° C. for 30 minutes in a hydrogen gas atmosphere and a propane gas atmosphere. The electric resistance of each disk was measured substantially continuously throughout the 30 minutes, and its change in resistance was studied based on the value obtained immediately after it had been placed in the reducing atmosphere. The results are shown in FIG. 1. As is obvious from FIG. 1, the sample of the prior art (No. 5) showed a change of 70 to 80% in resistance in the hydrogen gas as shown by a broken-line curve 1 and in the propane gas as shown by a broken-line curve 2, but the sample of this invention (No. 36) did not show any appreciable change in resistance either in hydrogen or in propane. These results confirm the excellent anti-reducing property of the porcelain according to this invention in hydrogen and propane gas.

Second Aspect of the Invention:

EXAMPLE 1

Study of anti-reducing property in hydrogen gas:
$BaCO_3$, $TiO_2$, $Al_2O_3$, $SiO_2$, yttrium oxide ($Y_2O_3$), ZnO or $ZnCO_3$ and PbO or $PbTiO_3$ were prepared in accordance with the 55 recipes shown in TABLES 5 to 7. All of them had been selected from industrial materials. They and agate were ground and mixed in a wet ball mill for 20 hours. After each mixture had been dried, it was calcined at a temperature of about 1100° C. for four hours. A very small amount of manganese dioxide ($MnO_2$) was added to the calcined product to improve its voltage withstanding property (or positive temperature coefficient of resistance), and it and agate were ground and mixed in a wet ball mill for 20 hours. After the mixed powder had been dried, 1% by weight of a 10% aqueous solution of polyvinyl alcohol was added thereto as a binder, and the mixture was press molded at a pressure of 800 kg/cm². The molded product was fired at a temperature of about 1320° C. for about an hour in the air to yield a 25 mm dia., 2.5 mm thick disk of semiconducting porcelain having a positive temperature coefficient of resistance.

Sample No. 24 of porcelain according to this invention showed a resistivity of 42 Ω.cm, a Curie point of 200° C., a withstanding voltage of 150 V, and a water absorbing capacity of 0.01% by weight which was extremely lower than that (0.5% by weight) of the material known in the art.

A Ni-Ag electrode was formed by the electroless plating of Ni and the application of a paste of Ag on each side of each of the 55 disks of porcelain which had been obtained, and its electric resistance (resistivity $R_0$) was measured at 20° C. in the air. The results are shown in TABLE 5, 6 or 7. Each disk was also placed in a hydrogen gas atmosphere, and its resistances $R_1$ and $R_2$ were measured at 300° C. immediately after it had been placed in the hydrogen gas atmosphere, and 30 minutes thereafter, respectively. A ratio of change in resistance (ΔR) was calculated by equation (3):

$$R = 100 \times (R_2 - R_1)/R_1 \qquad (3)$$

The closer $R_2$ is to $R_1$, or the closer R is to zero, the better anti-reducing property the porcelain has.

TABLE 5

| | Barium titanate composition (100 parts by weight) | | | | | Flux composition | | | | | | | Properties | | | |
|---|---|---|---|---|---|---|---|---|---|---|---|---|---|---|---|---|
| | | | | | | | | | | | | | | Anti-reducing property | | |
| | | | | | | | | | | | | | | | Lowering in positive temperature coefficient of resitance digit | |
| No. | BaCO₃ Mol ratio | TiO₂ Mol ratio | PbO | *1 PbTiO₃ | Al₂O₃ wt % | TiO₂ wt % | SiO₂ wt % | *2 ZnO Mol % | *2 ZnCO₃ Mol % | Curie point °C. | Resistivity Ro Ω. cm | ΔR Evaluation % | | | | Overall evaluation |
| 1 | 100 | 100 | * | * | * | * | 0.8 | * | * | 132 | 11 | −62 | X | −4.1 | X | X |
| 2 | ↑ | ↑ | * | * | * | 0.59 | 0.4 | * | * | ↑ | 13 | −54 | X | −4.0 | X | X |
| 3 | ↑ | ↑ | * | * | * | ↑ | 0.8 | * | * | ↑ | 12 | −82 | X | −4.5 | X | X |
| 4 | ↑ | ↑ | * | * | 0.4 | ↑ | * | * | * | ↑ | 4.8k | −68 | X | — | — | X |
| 5 | ↑ | ↑ | * | * | 0.8 | ↑ | * | * | * | ↑ | 63k | −76 | X | — | — | X |
| 6 | ↑ | ↑ | * | * | 0.4 | ↑ | 0.4 | * | * | ↑ | 10 | 0 | O | +0.2 | O | O |
| 7 | 96.0 | 96.0 | * | 4.0 | * | * | 0.8 | * | * | 150 | 12 | −68 | X | −4.2 | X | X |
| 8 | 93.9 | 93.9 | * | 6.1 | * | * | ↑ | * | * | 160 | 19 | −84 | X | −4.6 | X | X |
| 9 | ↑ | 100 | 6.1 | * | * | * | ↑ | * | * | ↑ | 11 | −92 | X | −4.7 | X | X |
| 10 | 96.0 | 96.0 | * | 4.0 | 0.4 | 0.59 | 0.4 | * | * | 150 | 17 | −2.2 | O | −0.3 | O | O |
| 11 | 93.9 | 93.9 | * | 6.1 | ↑ | ↑ | ↑ | * | * | 160 | 22 | −39 | Δ | −2.1 | X | X |
| 12 | 90.1 | 90.1 | * | 9.9 | ↑ | ↑ | ↑ | * | * | 180 | 35 | −68 | X | −3.2 | X | X |
| 13 | 96.0 | 100 | 4.0 | * | ↑ | ↑ | ↑ | * | * | 150 | 17 | 0 | O | +0.1 | O | O |
| 14 | 93.9 | ↑ | 6.1 | * | ↑ | ↑ | ↑ | * | * | 160 | 17 | −4.1 | O | −0.4 | O | O |
| 15 | 90.1 | ↑ | 9.9 | * | ↑ | ↑ | ↑ | * | * | 180 | 18 | −8.1 | O | −0.9 | O | O |
| 16 | 86.5 | ↑ | 13.5 | * | ↑ | ↑ | ↑ | * | * | 200 | 25 | −12 | Δ | −1.3 | Δ | Δ |
| 17 | 90.1 | 90.1 | * | 9.9 | ↑ | ↑ | ↑ | 0.01 | * | 180 | 34 | −21 | Δ | −1.7 | Δ | Δ |
| 18 | ↑ | ↑ | * | ↑ | ↑ | ↑ | ↑ | 0.02 | * | ↑ | 36 | −11 | Δ | −1.2 | Δ | Δ |
| 19 | ↑ | ↑ | * | ↑ | ↑ | ↑ | ↑ | 0.05 | * | ↑ | 37 | −4.3 | O | −0.2 | O | O |
| 20 | ↑ | ↑ | * | ↑ | ↑ | ↑ | ↑ | 0.1 | * | ↑ | 37 | −2.3 | O | +0.2 | O | O |
| 21 | ↑ | ↑ | * | ↑ | ↑ | ↑ | ↑ | 0.2 | * | ↑ | 67 | −0.3 | O | +0.1 | O | O |
| 22 | ↑ | ↑ | * | ↑ | ↑ | ↑ | ↑ | 0.3 | * | ↑ | 156 | −2.1 | O | — | — | O |
| 23 | ↑ | ↑ | * | ↑ | ↑ | ↑ | ↑ | 0.5 | * | ↑ | 4.7k | −2.6 | O | — | — | O |

TABLE 6

| | Barium titanate composition (100 parts by weight) | | | | | Flux composition | | | | | | | Properties | | | |
|---|---|---|---|---|---|---|---|---|---|---|---|---|---|---|---|---|
| | | | | | | | | | | | | | | Anti-reducing property | | |
| | | | | | | | | | | | | | | | Lowering in positive temperature coefficient of resistance | |
| No | BaCO₃ Mol ratio | TiO₂ Mol ratio | PbO | *1 PbTiO₃ | Al₂O₃ wt % | TiO₂ wt % | SiO₂ wt % | *2 ZnO Mol % | *2 ZnCO₃ Mol % | Curie point °C. | Resistivity Ro Ω. cm | ΔR Evaluation % | | Digit | | Overall evaluation |
| 24 | | 86.5 | * | 13.5 | 0.4 | 0.59 | 0.4 | 0.1 | * | 200 | 42 | 4.4 | O | −0.4 | O | O |
| 25 | ↑ | ↑ | * | ↑ | ↑ | ↑ | ↑ | * | 0.1 | ↑ | 45 | −52 | O | −0.3 | O | O |
| 26 | ↑ | 100 | 13.5 | * | ↑ | ↑ | ↑ | 0.1 | * | ↑ | 67 | −2.1 | O | +0.1 | O | O |
| 27 | ↑ | ↑ | ↑ | * | ↑ | ↑ | ↑ | * | 0.1 | ↑ | 62 | −1.7 | O | −0.2 | O | O |
| 28 | 90.1 | 90.1 | * | 9.9 | 0.1 | 0.14 | 0.1 | 0.1 | * | 180 | 140 | −21 | Δ | — | — | Δ |
| 29 | ↑ | ↑ | * | ↑ | 0.4 | ↑ | 0.4 | ↑ | * | ↑ | 60 | −7.6 | O | +0.1 | O | O |
| 30 | ↑ | ↑ | * | ↑ | 0.8 | ↑ | 0.8 | ↑ | * | ↑ | 580 | −3.8 | 0 | — | — | O |
| 31 | ↑ | ↑ | * | ↑ | 0.1 | 0.59 | 0.1 | ↑ | * | ↑ | 130 | −18 | Δ | — | — | Δ |
| 32 | ↑ | ↑ | * | ↑ | ↑ | ↑ | 0.4 | ↑ | * | ↑ | 60 | −17 | Δ | −1.8 | Δ | Δ |
| 33 | ↑ | ↑ | * | ↑ | ↑ | ↑ | 1.6 | ↑ | * | ↑ | 96 | −31 | Δ | −2.0 | X | X |
| 34 | ↑ | ↑ | * | ↑ | 0.2 | ↑ | 0.1 | ↑ | * | ↑ | 135 | −7.5 | O | — | — | O |
| 35 | ↑ | ↑ | * | ↑ | ↑ | ↑ | 0.2 | ↑ | * | ↑ | 32 | −8.8 | O | −0.1 | O | O |
| 36 | ↑ | ↑ | * | ↑ | ↑ | ↑ | 0.8 | ↑ | * | ↑ | 25 | −6.4 | O | −0.4 | O | O |
| 37 | ↑ | ↑ | * | ↑ | ↑ | ↑ | 1.6 | ↑ | * | ↑ | 80 | −9.5 | O | −0.7 | O | O |
| 38 | ↑ | ↑ | * | ↑ | 0.4 | ↑ | 0.1 | ↑ | * | ↑ | 145 | −6.2 | O | — | — | — |
| 39 | ↑ | ↑ | * | ↑ | ↑ | ↑ | 0.2 | ↑ | * | ↑ | 34 | −0.5 | O | +0.2 | O | O |
| 40 | ↑ | ↑ | * | ↑ | ↑ | ↑ | 0.8 | ↑ | * | ↑ | 41 | −1.9 | O | +0.2 | O | O |
| 41 | ↑ | ↑ | * | ↑ | ↑ | ↑ | 1.6 | ↑ | * | ↑ | 108 | −8.3 | O | — | — | O |
| 42 | ↑ | ↑ | * | ↑ | 0.6 | ↑ | 0.1 | ↑ | * | ↑ | 3.2k | −2.9 | O | — | — | O |
| 43 | ↑ | ↑ | * | ↑ | ↑ | ↑ | 0.2 | ↑ | * | ↑ | 211 | −4.8 | O | — | — | O |
| 44 | ↑ | ↑ | * | ↑ | ↑ | ↑ | 0.4 | ↑ | * | ↑ | 120 | −5.6 | O | — | — | O |
| 45 | ↑ | ↑ | * | ↑ | ↑ | ↑ | 0.8 | ↑ | * | 302 | | −5.5 | O | — | — | O |
| 46 | ↑ | ↑ | * | ↑ | 0.8 | ↑ | 0.4 | ↑ | * | ↑ | 6.2k | −7.1 | O | — | — | O |

TABLE 7

| | Barium titanate composition (100 parts by weight) | | | | Flux composition | | | | Curie point °C. | Resistivity Ro Ω·cm | Properties | | | | |
|---|---|---|---|---|---|---|---|---|---|---|---|---|---|---|---|
| | | | | | | | | | | | Anti-reducing property | | | | |
| | | | | | | | | | | | ΔR Evaluation % | | Lowering in positive temperature coefficient of resistance Digit | | Overall evaluation |
| No. | BaCO₃ Mol ratio | TiO₂ Mol ratio | PbO | *1 PbTiO₃ | Al₂O₃ wt % | TiO₂ wt % | SiO₂ wt % | *2 ZnO Mol % | *2 ZnCO₃ Mol % | | | | | | |
| 47 | ↑ | ↑ | * | ↑ | ↑ | ↑ | 0.8 | ↑ | * | ↑ | 148k | −3.2 | O | — | — | O |
| 48 | ↑ | ↑ | * | ↑ | 1.6 | ↑ | 0.4 | ↑ | * | ↑ | ∞ | — | — | — | — | — |
| 49 | ↑ | ↑ | * | ↑ | 0.2 | 1.15 | 0.2 | ↑ | * | ↑ | 96 | −5.6 | O | −0.6 | O | O |
| 50 | ↑ | ↑ | * | ↑ | ↑ | ↑ | 0.6 | ↑ | * | ↑ | 94 | −5.5 | O | −0.4 | O | O |
| 51 | ↑ | ↑ | * | ↑ | 0.4 | ↑ | 0.4 | ↑ | * | ↑ | 69 | −4.4 | O | +0.1 | O | O |
| 52 | ↑ | ↑ | * | ↑ | 0.6 | ↑ | 0.2 | ↑ | * | ↑ | 220 | −8.5 | O | — | — | O |
| 53 | ↑ | ↑ | * | ↑ | 0.8 | ↑ | 0.8 | ↑ | * | ↑ | 2.4k | −7.1 | O | — | — | O |
| 54 | ↑ | ↑ | * | ↑ | 0.2 | 2.88 | 0.6 | ↑ | * | ↑ | 480 | −3.3 | O | — | — | O |
| 55 | ↑ | ↑ | * | ↑ | 0.4 | ↑ | 0.4 | ↑ | * | ↑ | 880 | −7.2 | O | — | — | O |

*1 Added after calcining.
*2 Mol % to barium and lead.
*3 In the column of resistivity, K means × 10³.

The results are shown in TABLE 5, 6 or 7. In TABLES 5 to 7, the evaluation marks, 'circle', 'triangle' and 'cross', indicate that R was from 0 to −10%, from −10 to −50%, and over −50%, respectively.

TABLES 5 to 7 confirm the excellent anti-reducing property of the samples of porcelain according to this invention containing 0.2 to 1.6 parts by weight of Al₂O₃, 0.14 to 2.88 parts by weight of TiO₂ and 0.1 to 1.6 parts by weight of SiO₂ per 100 parts by weight of the barium titanate composition and 0.05 to 0.3 mol of a zinc compound per 100 mols of the barium titanate composition (Nos. 19 to 22, 24 to 27, 29, 30 and 34 to 55), as compared with the other samples of the same barium titanate composition (Nos. 12, 17, 18, 28 and 31 to 33 which are identical in barium titanate composition to Nos. 19 to 22, 29, 30 and 34 to 55, respectively, and No. 16 which is identical to Nos. 26 and 27), since the former samples have a ΔR value which is as small as −0.3 to −9.5, as opposed to the value of −11 to −31 shown by the other or comparative samples. The proportions of the first three flux constituents will hereinafter be stated by % by weight, and the proportion of the zinc compound by mol %. The samples which are preferable in the proportions of the flux constituents, i.e., contain 0.2 to 0.4% by weight of Al₂O₃, 0.14 to 1.15% by weight of TiO₂, 0.2 to 0.8% by weight of SiO₂ and 0.05 to 0.2 mol % of the zinc compound (Nos. 19 to 21, 24 to 27, 29, 35, 36, 39, 40, 43 to 45 and 49 to 51) are particularly high in anti-reducing property and suitable for application to automobile parts, since they have a resistivity (R₀) which is lower than 100 Ω.cm, and a still smaller ΔR value ranging from −0.3 to −8.8 and expressed in the majority of the cases by an absolute value not exceeding 6.

EXAMPLE 2

Figure 3:
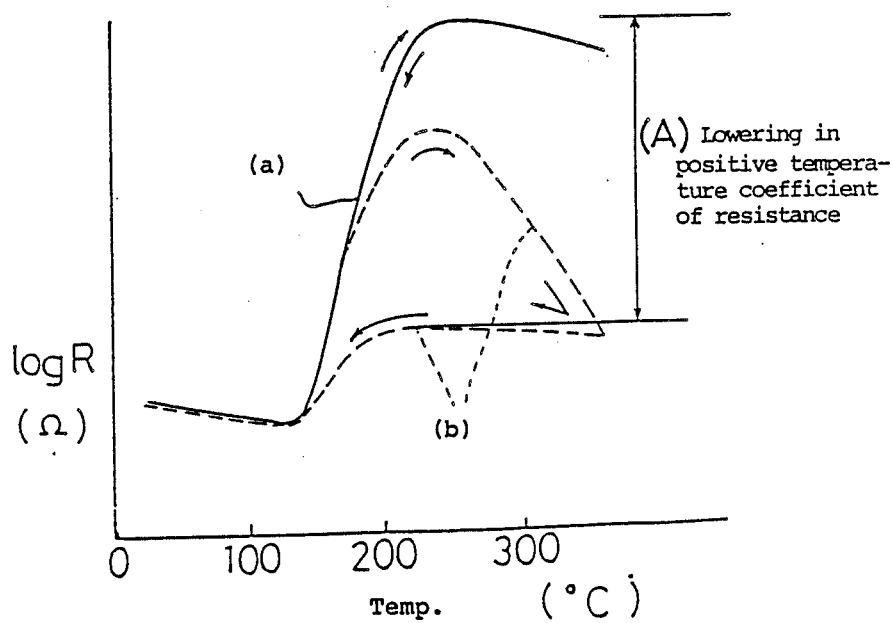
FIG. 3 is a graph showing changes of electric resistance in hydrogen gas.

Study of anti-reducing property in sour gasoline:
The procedures of EXAMPLE 1 were repeated for preparing 25 mm dia., 2.5 mm thick disks of positive coefficient semiconducting porcelain in accordance with the same recipes, and forming a Ni-Ag electrode on each side of each disk. The electric resistance of each disk was measured substantially continuously over a temperature range from the ambient temperature to 300° C. in the air. The results are shown by a solid-line curve (a) in FIG. 3. Then, each disk was subjected to an immersion voltage withstanding test. The test was conducted by immersing the disk in sour gasoline and applying a voltage of 30 V thereto for at least 200 hours.

The sour gasoline is a type of gasoline which has been oxidized to form a peroxide or an acid, and which is used for an accelerated test. Then, the electric resistance of each disk was measured substantially continuously over a temperature range from the ambient temperature to 300° C. The results are shown by a broken-line curve (b) in FIG. 3. A change in its positive temperature coefficient of resistance was obtained by comparing the two curves, and is shown at (A) in FIG. 3. The numerical data on such change are given in TABLES 5 to 7. The change (A) was calculated by the following equation:

Change $(A) = \log(R'\max./R'\min.) - \log(R\max./R\min.)$ where R is the resistance measured before the withstanding test, R' is the resistance measured after the withstanding test, max. is the maximum value, and min. is the minimum value.

TABLES 5 to 7 do not show data on certain samples, since no immersion voltage withstanding test was conducted on any sample of porcelain having a resistivity exceeding 100 .cm, as any such porcelain fails to produce a sufficiently large amount of heat during such a test to provide reliable data. The evaluation marks, 'circle', 'triangle' and 'cross', indicate that the absolute value of (A) is within 1, from 1 to 2, and over 2, respectively.

TABLES 5 to 7 show that the logarithmic value indicating the change in the positive temperature coefficient of resistance of the samples of porcelain according to this invention (Nos. 19 to 21, 24 to 27, 29, 35 to 37, 39, 40 and 49 to 51) was as small as +0.2 to −0.7, as opposed to the value of −0.9 to −3.2 of the other or comparative samples (e.g., Nos. 12, 16, 32 and 33), and that they are, therefore, superior to the comparative samples in anti-reducing property. The samples which are preferable in the proportions of the flux constituents, i.e., contain 0.2 to 0.4% by weight of Al₂O₃, 0.14 to 1.15% by weight of TiO₂, 0.2 to 0.8% by weight of SiO₂ and 0.05 to 0.2 mol of the zinc compound (Nos. 19 to 21, 24 to 27, 29, 35, 36, 39, 40 and 49 to 51) have, among others, an excellent anti-reducing property, as the values indicating their change in positive temperature coefficient of resistance are between +0.2 and —0.6, and if Sample No. 49 is excluded, between +0.2 and −0.4.

STUDY OF RESULTS OF EXAMPLES 1 AND 2

(1) Zinc compound:

ZnO and $ZnCO_3$ were substantially equally effective (compare Nos. 24 and 25, or 26 and 27).

(2) Proportions of flux constituents:

The samples containing 0.05, 0.1, 0.2, 0.3 or 0.5 mol % of a zinc compound (ZnO) (per 100 mols of the barium titanate composition) (Nos. 19 to 23)showed an excellent anti-reducing property. On the other hand, the samples containing 0.01 to 0.02 mol % (Nos. 17 and 18) were unsatisfactory in anti-reducing property in the presence of either hydrogen or sour gasoline, as shown by the 'triangle' mark in TABLE 5.

The samples containing 0.1% by weight of $Al_2O_3$ were low in anti-reducing property, as shown by the 'triangle' mark for hydrogen and by the 'triangle' or 'cross' mark for sour gasoline in TABLE 6 (Nos. 31 to 33).

TABLES 5 to 7 show that the samples of porcelain according to this invention containing 0.2 to 1.6% by weight of $Al_2O_3$, 0.14 to 2.88% by weight of $TiO_2$, 0.1 to 1.6% by weight of $SiO_2$ and 0.05 to 0.5 mol % of the zinc compound had an excellent anti-reducing property in the presence of hydrogen and sour gasoline.

(3) Timing for lead addition:

In order to produce positive coefficient semiconducting procelain having a high Curie point, it was found more effective to add PbO before calcining to form its solid solution with $BaTiO_3$ during calcining (Nos. 13 to 15, 26 and 27) than to add $PbTiO_2$ after calcining (Nos. 10 to 12, 24 and 25), from the standpoint of reducing the scattering loss of lead, lowering the water absorbing capacity of the porcelain and improving its anti-reducing property.

EXAMPLE 3

Figure 4:
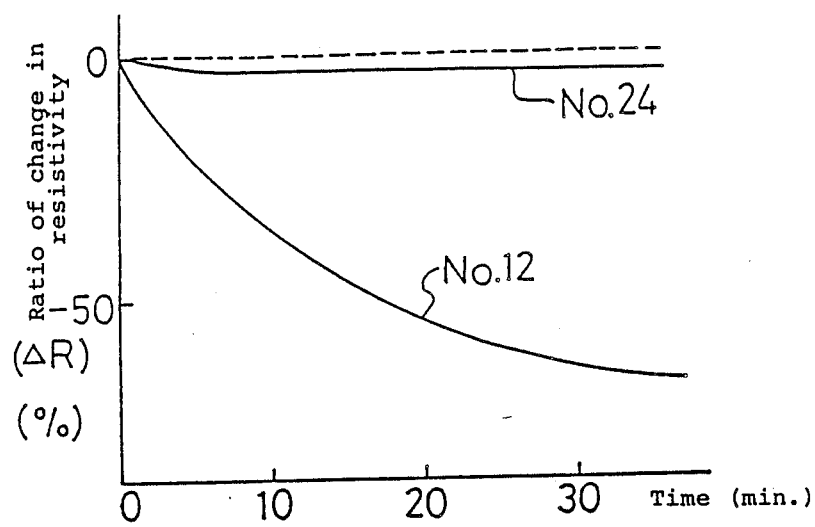
FIG. 4 is a graph showing a positive temperature coefficient of resistance lowered in sour gasoline.

The procedures of EXAMPLE 1 were repeated for preparing two 25 mm dia., 2.5 mm thick disks of semiconducting porcelain. One of them was identical to Sample No. 12 according to the prior art, and the other was identical to Sample No. 24 according to this invention. A Ni-Ag electrode was formed on each side of each disk and the disk was left at 300° C. for 30 minutes in a hydrogen gas atmosphere. The electric resistance of each disk was measured substantially continuously throughout the 30 minutes, and its change in resistance was studied based on the value obtained immediately after it has been placed in the reducing atmosphere. The results are shown in FIG. 4. As is obvious from FIG. 4, the sample of the prior art (No. 12) showed a reduction of 68% in resistance, but the sample of this invention (No. 24) showed a reduction of only 4.4%. These results confirm the excellent anti-reducing property of the porcelain according to this invention in a hydrogen gas atmosphere.

Although the reason for the improved anti-reducing property is not clear, it is presumably partly due to a drastic reduction in the water absorbing capacity of the porcelain which is due to the presence of the flux composed of $Al_2O_3$, $TiO_2$, $SiO_2$ and the zinc compound, and which leads to a reduction in the invasion of any reducing substance into the porcelain.

EXAMPLE 4

Figure 6:
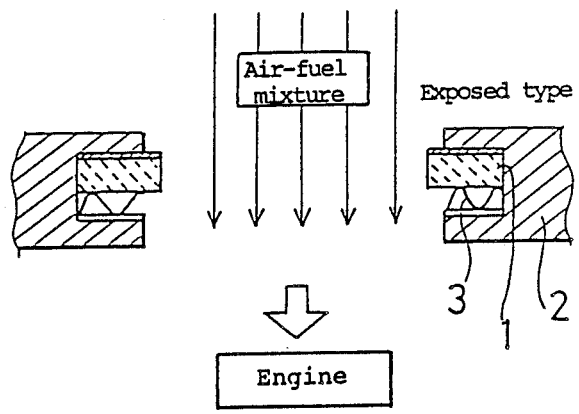
FIG. 6 is a view showing porcelain embodying this invention and employed in a gas heater for an engine in such a way that it may be isolated from a fuel-air mixture.

The porcelain of this invention can be exposed to gasoline. Therefore, comparison was made in torque performance between an engine provided with a conventional fuel-air mixture heater of the type in which the porcelain was isolated from the fuel-air mixture (FIG. 5) and an engine provided with a fuel-air mixture of the type in which the porcelain was exposed to the fuel-air mixture (FIG. 6). Numeral 2 in FIG. 6 designates a heat insulator provided within an intake air-fuel mixture passage which is connected with engine so that the air-fuel mixture flowiing through the intake passage is introduced into the engine. Heater means 1 is made of an anti-reducing semiconducting porcelain having a positive temperature coefficient of resistance in accordance with the present invention. Supporting spring 3 supports the heater means 1 against the heat insulator 2 in order to fix the position of the heater means within the heat insulator 2.

Figure 7:
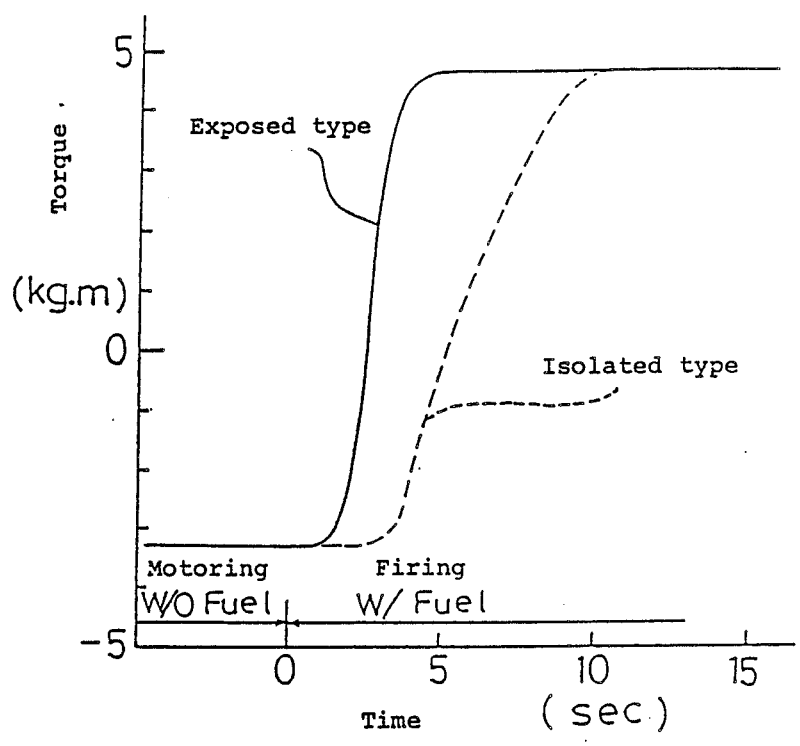
FIG. 7 is a graph comparing in torque performance the engines equipped with the heaters shown in FIGS. 3 and 4, respectively.

Since air-fuel mixture is an anti-reducing atmosphere, and since the heater means 1 of FIG. 6 is exposed to the air-fuel mixture, the heater means 1 should be one which is durable in that environment. The results are shown in FIG. 7. In both of the cases, the specifications of the engine were: 1600 rpm (1500 cc), 4.5 kg.m, W/choke, A/F: 11 to 12, and the porcelain was identical in composition to Sample No. 24. As is obvious from FIG. 7, the heater of the exposed type contributes to improving the torque performance of the engine.

Third Aspect of the Invention:

EXAMPLE 1

Study of anti-reducing property in hydrogen gas:

$BaCO_3$, $TiO_2$, $Al_2O_3$, $SiO_2$, yttrium oxide ($Y_2O_3$), $K_2CO_3$ or $KNO_3$ and PbO or $PbTiO_3$ were prepared in accordance with the 55 recipes shown in TABLES 8 to 10. They had all been selected from industrial materials. They and agate were ground and mixed in a wet ball mill for 20 hours. In TABLES 8 to 10, the amounts of $K_2CO_3$ and $KNO_3$ are shown by mol % of Ba and Pb, as stated at *2. After each mixture had been dried, it was calcined at a temperature of about 1100° C. for four hours. A very small amount of manganese dioxide ($MnO_2$) was added to the calcined product to improve its voltage withstanding capacity (or positive temperature coefficient of resistance). Then, it and agate were ground and mixed in a wet ball mill for 20 hours. After the mixed powder had been dried, 1% by weight of a 10% aqueous solution of polyvinyl alcohol was added thereto as a binder, and the mixture was press molded at a pressure of 800 kg/cm². The molded product was fired at a temperature of about 1320° C. for about an hour in the air to yield a 25 mm dia., 2.5 mm thick disk of a semiconducting porcelain having a positive temperature coefficient of resistance.

Sample No. 24 of porcelain showed a resistivity of 92 Ω.cm, a Curie point of 200° C., a withstanding voltage of 150 V, and a water absorbing capacity of 0.01% by weight which was extremely lower than that (0.5% by weight) of the conventional porcelain.

A Ni-Ag electrode was formed by the electroless plating of Ni and the application of a paste of Ag on each side of each of the 55 disks which had been prepared, and the electric resistance (resistivity $R_0$) of each disk was measured at 25° C. in the air. The results are shown in TABLE 8, 9 or 10. Each disk was also placed in a hydrogen gas atmosphere and its resistances $R_1$ and $R_2$ were measured at 300° C. immediately after it had been placed in the hydrogen gas atmosphere, and 30 minutes thereafter, respectively. A lowering or change in its resistance ($\Delta R$) was calculated by equation (3):

$$\Delta R = 100 \times (R_2 - R_1)/R_1 \qquad (3)$$

The closer $R_2$ is to $R_1$, or the closer $\Delta R$ is to zero, the higher anti-reducing property the porcelain has.

The evaluation marks, 'circle', 'triangle' and 'cross', in TABLES 8 to 10 indicate that the ratio $\Delta R$ of resistance lowering was from 0 to 10%, from 10 to 50%, and over 50%, respectively.

TABLES 8 to 10 confirm the excellent anti-reducing property of the samples of porcelain according to this invention containing 0.2 to 1.6% by weight of $Al_2O_3$, 0.14 to 2.88% by weight of $TiO_2$, 0.1 to 1.6% by weight of $SiO_2$ and 0.01 to 0.6 mol % of potassium relative to the barium titanate composition (Nos. 18 to 27, 29, 30 and 34 to 55), as compared with the other samples of porcelain containing four flux constituents (Nos. 17, 28 and 31 to 33), since the former samples showed a $\Delta R$ value of $-0.5$ to $-9.5\%$, as opposed to the value of $-21$ to $-62\%$ of the latter or comparative samples. The samples which are preferable in the proportions of the flux constituents, i.e., contain 0.2 to 0.4% by weight of $Al_2O_3$, 0.14 to 1.15% by weight of $TiO_2$, 0.2 to 0.8% by weight of $SiO_2$ and 0.01 to 0.2 mol % of potassium (Nos. 18 to 20, 24 to 27, 29, 35, 36, 39, 40 and 49 to 51), are particularly excellent in anti-reducing property and suitable for application to automobile parts, as they have a resistivity which is lower than 200 Ω.cm and for the greater part even lower than 100 Ω.cm, and a small ratio $\Delta R$ of resistance lowering.

EXAMPLE 2

Figure 8:
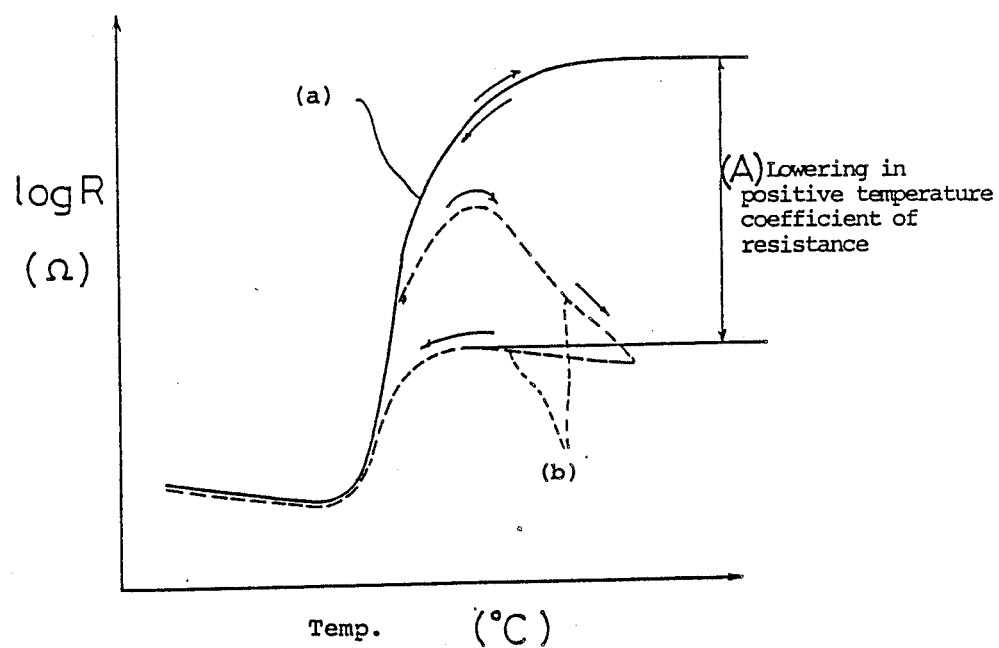
FIG. 8 is a graph showing a positive temperature coefficient of resistance lowered in sour gasoline.

Study of anti-reducing property in sour gasoline:

The procedures of EXAMPLE 1 were repeated for preparing 25 mm dia., 2.5 mm thick disks of positive coefficient semiconducting porcelain in accordance with the same recipes, and forming a Ni-Ag electrode on each side of each disk. The electric resistance of each disk was measured substantially continuously over a temperature range from the ambient temperature to 300° C. in the air. The results are shown by a solid-line curve (a) in FIG. 8. Then, each disk was subjected to an immersion voltage withstanding test. The test was conducted by immersing the disk in sour gasoline and applying a voltage of 30 V thereto for at least 200 hours. The sour gasoline is a type of gasoline which has been oxidized to form a peroxide or an acid, and which is used for an accelerated test. After the test had been over, the electric resistance of each disk was measured substantially continuously over a temperature range from the ambient temperature to 300° C. in the air. The results are shown by a broken-line curve (b) in FIG. 8. A change in its positive temperature coefficient of resistance was obtained by comparing the two curves, and is shown at (A) in FIG. 8. The results are shown in TABLE 8, 9 or 10.

TABLE 8

| | Barium titanate composition (100 parts by weight) | | | | Flux composition | | | *2 $K_2CO_3$ | *2 $KNO_3$ | | *3 | Properties Anti-reducing property | | | |
|---|---|---|---|---|---|---|---|---|---|---|---|---|---|---|---|
| | | | | | | | | | | | | | | Lowering in positive temperature coefficient of resistance Digit | | Overall Evaluation |
| No. | $BaCO_3$ mol ratio | $TiO_2$ mol ratio | PbO | *1 $PbTiO_3$ | $Al_2O_3$ wt % | $TiO_2$ wt % | $SiO_2$ wt % | Composition Mol % | Composition Mol % | Curie point °C. | Resistivity Ω·cm | $\Delta R$ % | Evaluation | | |
| 1 | 100 | 100 | * | * | * | * | 0.8 | * | * | 132 | 11 | −62 | X | −4.1 | X | X |
| 2 | ↑ | ↑ | * | * | * | 0.59 | 0.4 | * | * | ↑ | 13 | −54 | X | −4.0 | X | X |
| 3 | ↑ | ↑ | * | * | * | 0.59 | 0.8 | * | * | ↑ | 12 | −82 | X | −4.5 | X | X |
| 4 | ↑ | ↑ | * | * | 0.4 | 0.59 | * | * | * | ↑ | 4.8k | −68 | X | — | — | X |
| 5 | ↑ | ↑ | * | * | 0.8 | 0.59 | * | * | * | ↑ | 63k | −76 | X | — | — | X |
| 6 | ↑ | ↑ | * | * | 0.4 | 0.59 | 0.4 | * | * | ↑ | 10 | 0 | O | +0.2 | O | O |
| 7 | 96.0 | 96.0 | * | 4.0 | * | * | 0.8 | * | * | 150 | 12 | −68 | X | −4.2 | X | X |
| 8 | 93.9 | 93.9 | * | 6.1 | * | * | ↑ | * | * | 160 | 19 | −84 | X | −4.7 | X | X |
| 9 | ↑ | 100 | 6.1 | * | * | * | ↑ | * | * | ↑ | 11 | −92 | X | −4.7 | X | X |
| 10 | 96.0 | 96.0 | * | 4.0 | 0.4 | 0.59 | 0.4 | * | * | 150 | 17 | −2.2 | O | −0.3 | O | O |
| 11 | 93.9 | 93.9 | * | 6.1 | ↑ | ↑ | ↑ | * | * | 160 | 22 | −39 | Δ | −2.1 | X | X |
| 12 | 90.1 | 90.1 | * | 9.9 | ↑ | ↑ | ↑ | * | * | 180 | 35 | −68 | X | −3.2 | X | X |
| 13 | 96.0 | 100 | 4.0 | * | ↑ | ↑ | ↑ | * | * | 150 | 17 | 0 | O | +0.1 | O | O |
| 14 | 93.9 | ↑ | 6.1 | * | ↑ | ↑ | ↑ | * | * | 160 | 17 | −4.1 | O | −0.4 | O | O |
| 15 | 90.1 | ↑ | 9.9 | * | ↑ | ↑ | ↑ | * | * | 180 | 18 | −8.1 | O | −0.9 | O | O |
| 16 | 86.5 | ↑ | 13.5 | * | ↑ | ↑ | ↑ | * | * | 200 | 25 | −12 | Δ | −1.3 | Δ | Δ |
| 17 | 90.1 | 90.1 | * | 9.9 | ↑ | ↑ | ↑ | 0.001 | * | 180 | 40 | −43 | Δ | −2.6 | X | X |
| 18 | ↑ | ↑ | * | ↑ | ↑ | ↑ | ↑ | 0.005 | * | ↑ | 52 | −9 | O | −0.9 | O | O |
| 19 | ↑ | ↑ | * | ↑ | ↑ | ↑ | ↑ | 0.01 | * | ↑ | 80 | −2.5 | O | −0.2 | O | O |
| 20 | ↑ | ↑ | * | ↑ | ↑ | ↑ | ↑ | 0.05 | * | ↑ | 82 | −1.6 | O | +0.1 | O | O |
| 21 | ↑ | ↑ | * | ↑ | ↑ | ↑ | ↑ | 0.1 | * | ↑ | 87 | −0.5 | O | — | — | O |
| 22 | ↑ | ↑ | * | ↑ | ↑ | ↑ | ↑ | 0.2 | * | ↑ | 400 | −0.7 | O | — | — | O |
| 23 | ↑ | ↑ | * | ↑ | ↑ | ↑ | ↑ | 0.3 | * | ↑ | 17k | −4.1 | O | — | — | O |

TABLE 9

| No. | Barium titanate composition (100 parts by weight) BaCO$_3$ mol ratio | TiO$_2$ mol ratio | PbO | *1 PbTiO$_3$ | Flux composition Al$_2$O$_3$ wt % | TiO$_2$ wt % | SiO$_2$ wt % | *2 K$_2$CO$_3$ Composition Mol % | *2 KNO$_3$ Composition Mol % | Curie point °C. | *3 Resistivity Ω·cm | ΔR Evaluation % | Anti-reducing property | Lowering in positive temperature coefficient of resistance | Digit | Overall Evaluation |
|---|---|---|---|---|---|---|---|---|---|---|---|---|---|---|---|---|
| 24 | 86.5 | 86.5 | * | 13.5 | 0.4 | 0.59 | 0.4 | 0.1 | * | 200 | 92 | −6.4 | O | +0.1 | O | O |
| 25 | ↑ | ↑ | * | ↑ | ↑ | ↑ | ↑ | * | 0.2 | ↑ | 85 | −5.2 | O | −0.2 | O | O |
| 26 | ↑ | 100 | 13.5 | * | ↑ | ↑ | ↑ | 0.1 | * | ↑ | 87 | −7.3 | O | −0.1 | O | O |
| 27 | ↑ | ↑ | ↑ | * | ↑ | ↑ | ↑ | * | 0.2 | ↑ | 94 | −5.4 | O | −0.1 | O | O |
| 28 | 90.1 | 90.1 | * | 9.1 | 0.1 | 0.14 | 0.1 | 0.1 | * | 180 | 200 | −21 | Δ | — | — | Δ |
| 29 | ↑ | ↑ | * | ↑ | 0.4 | ↑ | 0.4 | ↑ | * | ↑ | 85 | −6.9 | O | +0.1 | O | O |
| 30 | ↑ | ↑ | * | ↑ | 0.8 | ↑ | 0.8 | ↑ | * | ↑ | 800 | −2.1 | O | — | — | O |
| 31 | ↑ | ↑ | * | ↑ | 0.1 | 0.59 | 0.1 | ↑ | * | ↑ | 227 | −30 | Δ | — | — | Δ |
| 32 | ↑ | ↑ | * | ↑ | ↑ | ↑ | 0.4 | ↑ | * | ↑ | 97 | −27 | Δ | −0.4 | O | Δ |
| 33 | ↑ | ↑ | * | ↑ | ↑ | ↑ | 1.6 | ↑ | * | ↑ | 110 | −62 | X | — | — | X |
| 34 | ↑ | ↑ | * | ↑ | 0.2 | ↑ | 0.1 | ↑ | * | ↑ | 80 | −7.6 | O | −0.2 | O | O |
| 35 | ↑ | ↑ | * | ↑ | ↑ | ↑ | 0.2 | ↑ | * | ↑ | 95 | −7.2 | O | −0.3 | O | O |
| 36 | ↑ | ↑ | * | ↑ | ↑ | ↑ | 0.8 | ↑ | * | ↑ | 130 | −8.8 | O | — | — | O |
| 37 | ↑ | ↑ | * | ↑ | ↑ | ↑ | 1.6 | ↑ | * | ↑ | 650 | −8.2 | O | — | — | O |
| 38 | ↑ | ↑ | * | ↑ | 0.4 | ↑ | 0.1 | ↑ | * | ↑ | 140 | −7.6 | O | — | — | O |
| 39 | ↑ | ↑ | * | ↑ | ↑ | ↑ | 0.2 | ↑ | * | ↑ | 95 | −2.1 | O | +0.1 | O | O |
| 40 | ↑ | ↑ | * | ↑ | ↑ | ↑ | 0.8 | ↑ | * | ↑ | 108 | O | — | — | O |  |
| 41 | ↑ | ↑ | * | ↑ | ↑ | ↑ | 1.6 | ↑ | * | ↑ | 1.05k | −7.6 | O | — | — | O |
| 42 | ↑ | ↑ | * | ↑ | 0.6 | ↑ | 0.1 | ↑ | * | ↑ | 5.6k | −2.5 | O | — | — | O |
| 43 | ↑ | ↑ | * | ↑ | ↑ | ↑ | 0.2 | ↑ | * | ↑ | 250 | −6.4 | O | — | — | O |
| 44 | ↑ | ↑ | * | ↑ | ↑ | ↑ | 0.4 | ↑ | * | ↑ | 225 | −4.6 | O | — | — | O |
| 45 | ↑ | ↑ | * | ↑ | ↑ | ↑ | 0.8 | ↑ | * | ↑ | 413 | −5.5 | O | — | — | O |
| 46 | ↑ | ↑ | * | ↑ | 0.8 | ↑ | 0.4 | ↑ | * | ↑ | 10k | −6.5 | O | — | — | O |

TABLE 10

| No. | Barium titanate composition (100 parts by weight) BaCO$_3$ mol ratio | TiO$_2$ mol ratio | PbO | *1 PbTiO$_3$ | Flux composition Al$_2$O$_3$ wt % | TiO$_2$ wt % | SiO$_2$ wt % | *2 K$_2$CO$_3$ Composition Mol % | *2 KNO$_3$ Composition Mol % | Curie point °C. | *3 Resistivity Ω·cm | ΔR Evaluation | Anti-reducing property Lowering in positive temperature coefficient of resistance | Digit | Overall Evaluation |
|---|---|---|---|---|---|---|---|---|---|---|---|---|---|---|---|
| 47 | 90.1 | 90.1 | * | 9.1 | 0.8 | 0.59 | 0.8 | 0.1 | * | 180 | 92k | −2.9 | O | — | — | O |
| 48 | ↑ | ↑ | * | ↑ | 1.6 | ↑ | 0.4 | ↑ | * | ↑ | ∞ | — | — | — | — | — |
| 49 | ↑ | ↑ | * | ↑ | 0.2 | 1.15 | 0.2 | ↑ | * | ↑ | 225 | −8.2 | O | — | — | O |
| 50 | ↑ | ↑ | * | ↑ | ↑ | ↑ | 0.6 | ↑ | * | ↑ | 172 | −9.5 | O | — | — | O |
| 51 | ↑ | ↑ | * | ↑ | 0.4 | ↑ | 0.4 | ↑ | * | ↑ | 102 | −3.8 | O | — | — | O |
| 52 | ↑ | ↑ | * | ↑ | 0.6 | ↑ | 0.2 | ↑ | * | ↑ | 86 | −1.4 | O | −0.1 | O | O |
| 53 | ↑ | ↑ | * | ↑ | 0.8 | ↑ | 0.8 | ↑ | * | ↑ | 2.3k | −1.6 | O | — | — | O |
| 54 | ↑ | ↑ | * | ↑ | 0.2 | 2.88 | 0.6 | ↑ | * | ↑ | 4.6k | −7.6 | O | — | — | O |
| 55 | ↑ | ↑ | * | ↑ | 0.4 | ↑ | 0.4 | ↑ | * | ↑ | 10k | −2.5 | O | — | — | O |

*1 Added after calcining.
*2 Mol % to barium and lead.
*3 In the column of resistivity, K means × 10$^3$.

The value of (A) was calculated by the following equation:

Change $(A) = \log (R'\text{max.}/R'\text{min.}) - \log (R\text{max.}/R\text{min.})$ where R is the resistance measured before the withstanding test, R' is the resistance measured after the withstanding test, max. is the maximum value, and min. is the minimum value.

TABLES 8 to 10 do not show data on certain samples, since no immersion voltage withstanding test was conducted on any porcelain having a resistivity exceeding 100 Ω.cm, as any such porcelain fails to produce a sufficiently large amount of heat during such a test to provide reliable data. The evaluation marks, 'circle', 'triangle' and 'cross', in TABLES 8 to 10 indicate that the absolute value of (A) was within 1, from 1 to 2, and over 2, respectively.

TABLES 8 to 10 confirm the excellent anti-reducing property of the samples of porcelain according to this invention (Nos. 18 to 20, 24 to 27, 29, 34, 35, 39 and 52) as compared with the other samples (e.g., No. 17), since the logarithmic values indicating their change (A) are from +0.1 to −0.9, as opposed to the value of −2.6 in the case of Sample No. 17. Samples Nos. 18 to 20, 24 to 27, 29, 34, 35, 39 and 52 are representative of the preferred porcelain of this invention containing 0.2 to 0.4% by weight of Al$_2$O$_3$, 0.14 to 1.15% by weight of TiO$_2$, 0.2 to 0.8% by weight of SiO$_2$ and 0.01 to 0.2 mol % of potassium.

STUDY OF RESULTS OF EXAMPLES 1 AND 2

(1) Potassium compound:
Both K$_2$CO$_3$ and KNO$_3$ were substantially equally effective (compare Nos. 24 and 25, and 26 and 27).

(2) Proportions of flux constituents:

The samples of porcelain prepared by employing 0.005, 0.01, 0.05, 0.1, 0.2 or 0.3 mol % of $K_2CO_3$ (Nos. 18 to 23, respectively) were excellent in anti-reducing property. Samples Nos. 18 to 21 were, among others, preferable as their resistivity was lower than 100 $\Omega$.cm. On the other hand, Sample No. 17, which had been prepared by employing 0.001 mol % of $K_2CO_3$, was unsatisfactory in anti-reducing property in the presence of hydrogen and sour gasoline, as shown by the 'triangle' mark in TABLE 8.

Samples Nos. 28 and 31 to 33 containing 0.1% by weight of $Al_2O_3$ were low in anti-reducing property in the presence of hydrogen, as shown by the 'triangle' or 'cross' mark in TABLE 9. Sample No. 32 was, however, satisfactory in anti-reducing property in the presence of sour gasoline.

TABLES 8 to 10 confirm the excellent anti-reducing property in hydrogen or sour gasoline of the porcelain of this invention prepared by employing four flux constituents, and containing 0.2 to 1.6% by weight of $Al_2O_3$, 0.14 to 2.88% by weight of $TiO_2$, 0.1 to 1.6% by weight of $SiO_2$ and a potassium compound having a potassium content of 0.01 to 0.6 mol % (Nos. 17 to 55, except Nos. 17, 28 and 31 to 33).

Porcelain prepared by employing only three flux constituents, i.e., $Al_2O_3$, $TiO_2$ and $SiO_2$ (e.g., Nos. 11 and 12) is liable to reduction at a Curie point exceeding 150° C. (in the case of No. 11, 160° C., and in the case of No. 12, 180° C.). On the other hand, the porcelain of this invention (e.g., No. 24 or 25) is quite satisfactory in anti-reducing property even at a Curie point of 200° C. This is due to the addition of the potassium compound.

(3) Timing for lead addition:

In the event positive coefficient semiconducting porcelain having a high Curie point was produced, it was more effective to add PbO to form its solid solution with $BaTiO_3$ during calcining (Nos. 13 to 15, 26 and 27) for reducing the scattering loss of Pb, lowering the water absorbing capacity of the porcelain and improving its anti-reducing property than to add $PbTiO_3$ after calcining (Nos. 10 to 12, 24 and 25).

EXAMPLE 3

Figure 9:
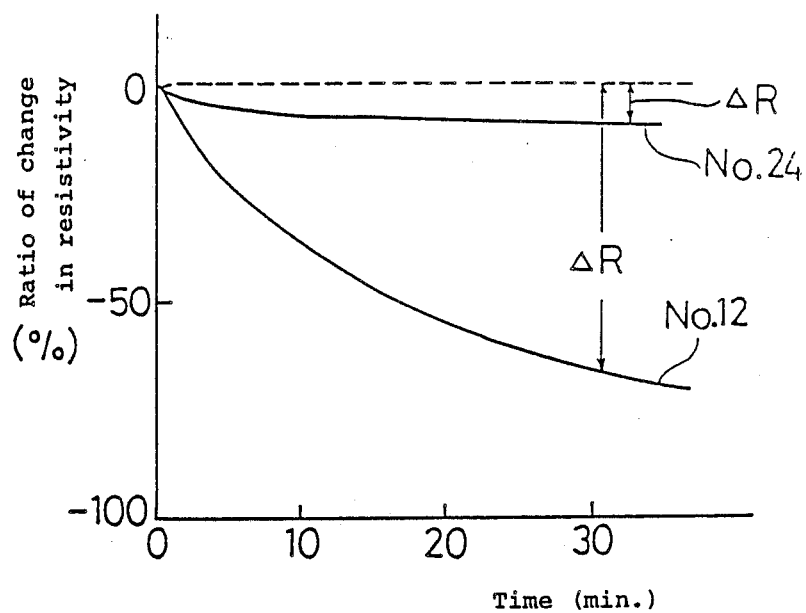
FIG. 9 is a graph showing changes of electric resistance in hydrogen gas.

The procedures of EXAMPLE 1 were repeated for preparing two 25 mm dia., 2.5 mm thick disks of positive coefficient semiconducting porcelain. One of them was identical to Sample No. 12 according to the prior art, and the other was identical to Sample No. 24 embodying this invention. A Ni-Ag electrode was formed on each side of each disk and each disk was left in a hydrogen gas atmosphere at 300° C. for 30 minutes. Its electric resistance was measured substantially continuously throughout the 30 minutes, and a ratio of its change in resistance was determined based on the value obtained immediately after it had been placed in the reducing atmosphere. The results are shown in FIG. 9. As is obvious from FIG. 9, Sample No. 12 containing only three flux constituents, but having a higher degree of performance than any other known positive coefficient semiconducting porcelain showed a lowering of 68% in resistance in the presence of hydrogen gas, but Sample No. 24 embodying this invention had its resistance lowered only by 6.4%. This confirms that the porcelain of this invention has a very high degree of anti-reducing property without showing any substantial change in resistance even in the presence of hydrogen gas.

Although the reason for the improved anti-reducing property of the porcelain according to this invention is not clear, it is apparently partly due to a drastic reduction in its water absorbing capacity which owes itself to the flux composed of $Al_2O_3$, $TiO_2$, $SiO_2$ and the potassium compound, and which decreases the invasion of any reducing substance into the porcelain.

EXAMPLE 4

Figure 5:
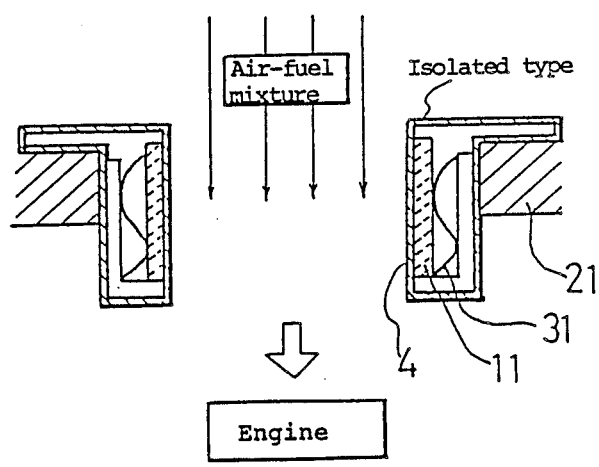
FIG. 5 is a view showing porcelain embodying this invention and employed in a gas heater for an engine in such a way that it may be exposed to a fuel-air mixture.
Figure 10:
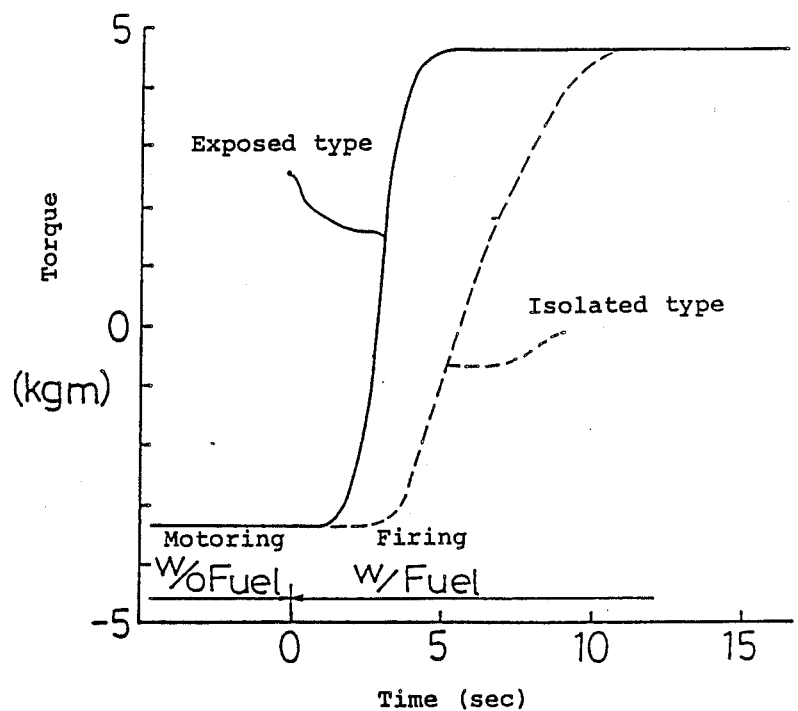
FIG. 10 is a graph showing the torque performance of engines.

Sample No. 24 of porcelain according to this invention was employed in a fuel-air heater for an engine in such a way that it might be exposed to the fuel-air mixture, as shown in FIG. 6, and also in a fuel-air heater for another engine in such a way that it might be isolated from the fuel-air mixture, as shown in FIG. 5. The two engines were compared with each other in torque performance. The results are shown in FIG. 10. The conditions under which the engines were operated were: 1600 rpm (1500 cc), 4.5 kg.m, W/choke, A/F: 11 to 12. The results confirm that the use of the exposed porcelain according to this invention contributes to improving the torque performance of the engine.

Fourth Aspect of the Invention:

EXAMPLE 1

Study of anti-reducing property in hydrogen gas:

$BaCO_3$, $TiO_2$, $Al_2O_3$, $SiO_2$, yttrium oxide ($Y_2O_3$), $Li_2CO_3$ or $Li_2O$ and PbO or $PbTiO_3$ were prepared in accordance with the 55 recipes shown in TABLES 11 to 13. They had all been selected from industrial materials. They and agate were ground and mixed in a wet ball mill for 20 hours. After each mixture had been dried, it was calcined at a temperature of about 1100° C. for four hours. A very small amount of manganese dioxide ($MnO_2$) was added to the calcined product to improve its voltage withstanding capacity (or positive temperature coefficient of resistance). The mixture and agate were ground and mixed in a wet ball mill for 20 hours. After the mixed powder had been dried, 1% by weight of a 10% aqueous solution of polyvinyl alcohol was added thereto as a binder and it was press molded at a pressure of 800 kg/cm². The molded product was fired at a temperature of about 1320° C. for about an hour in the air to yield a 25 mm dia., 2.5 mm thick disk of positive coefficient semiconducting porcelain.

Sample No. 24 of porcelain according to this invention showed a resistivity of 26 $\Omega$.cm, a Curie point of 200° C., a withstanding voltage of 150 V, and a water absorbing capacity of 0.01% by weight which was extremely lower than that (0.5% by weight) of any corresponding porcelain known in the art.

A Ni-Ag electrode was formed by the electroless plating of Ni and the application of a silver paste on each side of each of the 55 disks which had been prepared, and its electric resistance (resistivity $R_0$) was measured at 25° C. in the air. The results are shown in TABLE 11, 12 or 13. Each disk was also placed in a hydrogen gas atmosphere and its resistances $R_1$ and $R_2$ were measured at 300° C. immediately after it had been placed in the atmosphere, and 30 minutes thereafter, respectively. A ratio of its change in resistance ($\Delta R$) was calculated by equation (3):

$$\Delta R = 100 \times (R_2 - R_1)/R_1 \qquad (3)$$

The closer $R_2$ is to $R_1$, or the closer $\Delta R$ is to zero, the higher anti-reducing property the porcelain has.

The evaluation marks 'circle', 'triangle' and 'cross', in TABLES 11 to 13 indicate that the lowering ΔR of resistance was up to 10%, from 10 to 50%, and over 50%, respectively.

TABLES 11 to 13 confirm that Samples Nos. 18 to 27, 29, 30 and 34 to 55 containing 0.2 to 1.6% by weight of $Al_2O_3$, 0.14 to 2.88% by weight of $TiO_2$, 0.1 to 1.6% by weight of $SiO_2$ and a lithium compound having a lithium content of 0.04 to 2.0 mol % are definitely superior in anti-reducing property to Samples Nos. 17, 28 and 31 to 33 containing different proportions of those four flux constituents, since the former samples showed a resistance lowering R of only 0.2 to 9.4%, as opposed to the 12 to 41% of the latter or comparative samples. Samples Nos. 18 to 22, 24 to 27, 29, 35, 36, 39, 40 and 49 to 51, which are preferred examples of this invention as containing 0.2 to 0.4% by weight of $Al_2O_3$, 0.14 to 1.15% by weight of $TiO_2$, 0.2 to 0.8% by weight of $SiO_2$ and a lithium compound having a lithium content of 0.04 to 0.8 mol %, are particularly high in anti-reducing property and suitable for application to automobile parts, since their resistivity ($R_0$) is not higher than 80 Ω.cm, and their ΔR value is also small.

TABLE 11

| | Barium titanate composition (100 parts by weight) | | | | Flux composition | | | | | Properties | | | | | |
|---|---|---|---|---|---|---|---|---|---|---|---|---|---|---|---|
| | | | | | | | | *2 $Li_2CO_3$ | *2 $Li_2O$ | | | | Anti-reducing property | | |
| | | | | | | | | | | | | | Lowering in positive temperature | | |
| No. | $BaCO_3$ mol ratio | $TiO_2$ mol ratio | PbO | *1 $PbTiO_3$ | $Al_2O_3$ wt % | $TiO_2$ wt % | $SiO_2$ wt % | Composition Mol % | Composition Mol % | Curie point °C. | *3 Resistivity Ω·cm | ΔR Evaluation % | | coefficient of resistance Digit | Overall Evaluation |
| 1 | 100 | 100 | * | * | * | * | 0.8 | * | * | 132 | 11 | −62 | X | −4.1 X | X |
| 2 | ↑ | ↑ | * | * | * | 0.59 | 0.4 | * | * | ↑ | 13 | −54 | X | −4.0 X | X |
| 3 | ↑ | ↑ | * | * | * | 0.59 | 0.8 | * | * | ↑ | 12 | −82 | X | −4.5 X | X |
| 4 | ↑ | ↑ | * | * | 0.4 | 0.59 | * | * | * | ↑ | 4.8k | −68 | X | — — | X |
| 5 | ↑ | ↑ | * | * | 0.8 | 0.59 | * | * | * | ↑ | 63k | −76 | X | — — | X |
| 6 | ↑ | ↑ | * | * | 0.4 | 0.59 | 0.4 | * | * | ↑ | 10 | 0 | O | +0.2 O | O |
| 7 | 96.0 | 96.0 | * | 4.0 | * | * | 0.8 | * | * | 150 | 12 | −68 | X | −4.2 X | X |
| 8 | 93.9 | 93.9 | * | 6.1 | * | * | ↑ | * | * | 160 | 19 | −84 | X | −4.6 X | X |
| 9 | ↑ | 100 | 6.1 | * | * | * | ↑ | * | * | ↑ | 11 | −92 | X | −4.7 X | X |
| 10 | 96.0 | 96.0 | * | 4.0 | 0.4 | 0.59 | 0.4 | * | * | 150 | 17 | −2.2 | O | −0.3 O | O |
| 11 | 93.9 | 93.9 | * | 6.1 | ↑ | ↑ | ↑ | * | * | 160 | 22 | −39 | Δ | −2.1 X | X |
| 12 | 90.1 | 90.1 | * | 9.9 | ↑ | ↑ | ↑ | * | * | 180 | 35 | −68 | X | −3.2 X | X |
| 13 | 96.0 | 100 | 4.0 | * | ↑ | ↑ | ↑ | * | * | 150 | 17 | 0 | O | +0.1 O | O |
| 14 | 93.9 | ↑ | 6.1 | * | ↑ | ↑ | ↑ | * | * | 160 | 17 | −4.1 | O | −0.4 O | O |
| 15 | 90.1 | ↑ | 9.9 | * | ↑ | ↑ | ↑ | * | * | 180 | 18 | −8.1 | O | −0.9 O | O |
| 16 | 86.5 | ↑ | 13.5 | * | ↑ | ↑ | ↑ | * | * | 200 | 25 | −12 | Δ | −1.3 Δ | Δ |
| 17 | 90.1 | 90.1 | * | 9.9 | ↑ | ↑ | ↑ | 0.01 | * | 180 | 30 | −32 | Δ | −1.8 Δ | Δ |
| 18 | ↑ | ↑ | * | ↑ | ↑ | ↑ | ↑ | 0.02 | * | ↑ | 28 | −9 | O | −0.9 O | O |
| 19 | ↑ | ↑ | * | ↑ | ↑ | ↑ | ↑ | 0.05 | * | ↑ | 12 | −7.3 | O | −0.7 O | O |
| 20 | ↑ | ↑ | * | ↑ | ↑ | ↑ | ↑ | 0.1 | * | ↑ | 9 | −1.0 | O | +0.1 O | O |
| 21 | ↑ | ↑ | * | ↑ | ↑ | ↑ | ↑ | 0.3 | * | ↑ | 43 | −2.2 | O | +0.1 O | O |
| 22 | ↑ | ↑ | * | ↑ | ↑ | ↑ | ↑ | 0.4 | * | ↑ | 77 | −4.2 | O | ±0 O | O |
| 23 | ↑ | ↑ | * | ↑ | ↑ | ↑ | ↑ | 1.0 | * | ↑ | 270 | −9.4 | O | — — | O |

TABLE 12

| | Barium titanate composition (100 parts by weight) | | | | Flux composition | | | | | Properties | | | | | |
|---|---|---|---|---|---|---|---|---|---|---|---|---|---|---|---|
| | | | | | | | | *2 $Li_2CO_3$ | *2 $Li_2O$ | | | | Anti-reducing property | | |
| | | | | | | | | | | | | | Lowering in positive temperature | | |
| No. | $BaCO_3$ mol ratio | $TiO_2$ mol ratio | PbO | *1 $PbTiO_3$ | $Al_2O_3$ wt % | $TiO_2$ wt % | $SiO_2$ wt % | Composition Mol % | Composition Mol % | Curie point °C. | *3 Resistivity Ω·cm | ΔR Evaluation % | | coefficient of resistance Digit | Overall Evaluation |
| 24 | 86.5 | 86.5 | * | 13.5 | 0.4 | 0.59 | 0.4 | 0.1 | * | 200 | 26 | −9.1 | O | −0.8 O | O |
| 25 | ↑ | ↑ | * | ↑ | ↑ | ↑ | ↑ | * | 0.1 | ↑ | 28 | −8.2 | O | −0.7 O | O |
| 26 | ↑ | 100 | 13.5 | * | ↑ | ↑ | ↑ | 0.1 | * | ↑ | 17 | −1.2 | O | +0.2 O | O |
| 27 | ↑ | ↑ | ↑ | * | ↑ | ↑ | ↑ | * | 0.1 | ↑ | 16 | −0.2 | O | +0.1 O | O |
| 28 | 90.1 | 90.1 | * | 9.9 | 0.1 | 0.14 | 0.1 | 0.1 | * | 180 | 120 | −12 | Δ | — — | Δ |
| 29 | ↑ | ↑ | * | ↑ | 0.4 | ↑ | 0.4 | ↑ | * | ↑ | 45 | −1.4 | O | −0.2 O | O |
| 30 | ↑ | ↑ | * | ↑ | 0.8 | ↑ | 0.8 | ↑ | * | ↑ | 450 | −2.2 | O | — — | O |
| 31 | ↑ | ↑ | * | ↑ | 0.1 | 0.59 | 0.1 | ↑ | * | ↑ | 116 | −12 | Δ | — — | Δ |
| 32 | ↑ | ↑ | * | ↑ | ↑ | ↑ | 0.4 | ↑ | * | ↑ | 26 | −21 | Δ | −1.4 Δ | Δ |
| 33 | ↑ | ↑ | * | ↑ | ↑ | ↑ | 1.6 | ↑ | * | ↑ | 88 | −41 | Δ | −2.1 X | X |
| 34 | ↑ | ↑ | * | ↑ | 0.2 | ↑ | 0.1 | ↑ | * | ↑ | 96 | −8.4 | O | −0.6 O | O |
| 35 | ↑ | ↑ | * | ↑ | ↑ | ↑ | 0.2 | ↑ | * | ↑ | 26 | −7.2 | O | −0.5 O | O |
| 36 | ↑ | ↑ | * | ↑ | ↑ | ↑ | 0.8 | ↑ | * | ↑ | 18 | −9.1 | O | −0.7 O | O |
| 37 | ↑ | ↑ | * | ↑ | ↑ | ↑ | 1.6 | ↑ | * | ↑ | 64 | −8.1 | O | −0.7 O | O |
| 38 | ↑ | ↑ | * | ↑ | 0.4 | ↑ | 0.1 | ↑ | * | ↑ | 108 | −7.4 | O | — — | O |
| 39 | ↑ | ↑ | * | ↑ | ↑ | ↑ | 0.2 | ↑ | * | ↑ | 22 | −1.8 | O | +0.1 O | O |
| 40 | ↑ | ↑ | * | ↑ | ↑ | ↑ | 0.8 | ↑ | * | ↑ | 29 | −2.1 | O | +0.3 O | O |
| 41 | ↑ | ↑ | * | ↑ | ↑ | ↑ | 1.6 | ↑ | * | ↑ | 80 | −0.4 | O | +0.2 O | O |
| 42 | ↑ | ↑ | * | ↑ | 0.6 | ↑ | 0.1 | ↑ | * | ↑ | 1.1k | −5.2 | O | — — | O |
| 43 | ↑ | ↑ | * | ↑ | ↑ | ↑ | 0.2 | ↑ | * | ↑ | 92 | −5.5 | O | +0.1 O | O |
| 44 | ↑ | ↑ | * | ↑ | ↑ | ↑ | 0.4 | ↑ | * | ↑ | 84 | −4.4 | O | +0.2 O | O |
| 45 | ↑ | ↑ | * | ↑ | ↑ | ↑ | 0.8 | ↑ | * | ↑ | 211 | −6.2 | O | — — | O |

TABLE 12-continued

| No. | Barium titanate composition (100 parts by weight) | | | | Flux composition | | | | | Properties | | | | | |
|---|---|---|---|---|---|---|---|---|---|---|---|---|---|---|---|
| | | | | | | | | | | | | | Anti-reducing property | | |
| | BaCO$_3$ mol ratio | TiO$_2$ mol ratio | PbO | *1 PbTiO$_3$ | Al$_2$O$_3$ wt % | TiO$_2$ wt % | SiO$_2$ wt % | *2 Li$_2$CO$_3$ Composition Mol % | *2 Li$_2$O Composition Mol % | Curie point °C. | *3 Resistivity Ω·cm | ΔR Evaluation % | Lowering in positive temperature coefficient of resistance Digit | | Overall Evaluation |
| 46 | ↑ | ↑ | * | ↑ | 0.3 | ↑ | 0.4 | ↑ | * | ↑ | 2.1k | −7.2 | O | — | — | O |

TABLE 13

| No. | Barium titanate composition (100 parts by weight) | | | | Flux composition | | | | | Properties | | | | | |
|---|---|---|---|---|---|---|---|---|---|---|---|---|---|---|---|
| | | | | | | | | | | | | | Anti-reducing property | | |
| | BaCO$_3$ mol ratio | TiO$_2$ mol ratio | PbO | *1 PbTiO$_3$ | Al$_2$O$_3$ wt % | TiO$_2$ wt % | SiO$_2$ wt % | *2 Li$_2$CO$_3$ Composition Mol % | *2 Li$_2$O Composition Mol % | Curie point °C. | *3 Resistivity Ω·cm | ΔR Evaluation % | Lowering in positive temperature coefficient of resistance Digit | | Overall Evaluation |
| 47 | 90.1 | 90.1 | * | 9.9 | 0.8 | 0.59 | 0.8 | 0.1 | * | 180 | 86k | −4.7 | O | — | — | O |
| 48 | ↑ | ↑ | * | ↑ | 1.6 | ↑ | 0.4 | ↑ | * | ↑ | ∞ | — | — | — | — | — |
| 49 | ↑ | ↑ | * | ↑ | 0.2 | 1.15 | 0.2 | ↑ | * | ↑ | 80 | −6.2 | O | +0.1 | O | O |
| 50 | ↑ | ↑ | * | ↑ | ↑ | ↑ | 0.6 | ↑ | * | ↑ | 70 | −6.8 | O | −0.4 | O | O |
| 51 | ↑ | ↑ | * | ↑ | 0.4 | ↑ | 0.4 | ↑ | * | ↑ | 57 | −1.1 | O | +0.2 | O | O |
| 52 | ↑ | ↑ | * | ↑ | 0.6 | ↑ | 0.2 | ↑ | * | ↑ | 125 | −2.0 | O | — | — | O |
| 53 | ↑ | ↑ | * | ↑ | 0.8 | ↑ | 0.8 | ↑ | * | ↑ | 520 | −3.7 | O | — | — | O |
| 54 | ↑ | ↑ | * | ↑ | 0.2 | 2.88 | 0.6 | ↑ | * | ↑ | 348 | −2.2 | O | — | — | O |
| 55 | ↑ | ↑ | * | ↑ | 0.4 | ↑ | 0.4 | ↑ | * | ↑ | 287 | −5.6 | O | — | — | O |

*1 Added after calcining.
*2 Mol % to barium and lead.
*3 In the column of resistivity, K means × 10$^3$.

EXAMPLE 2

Figure 11:
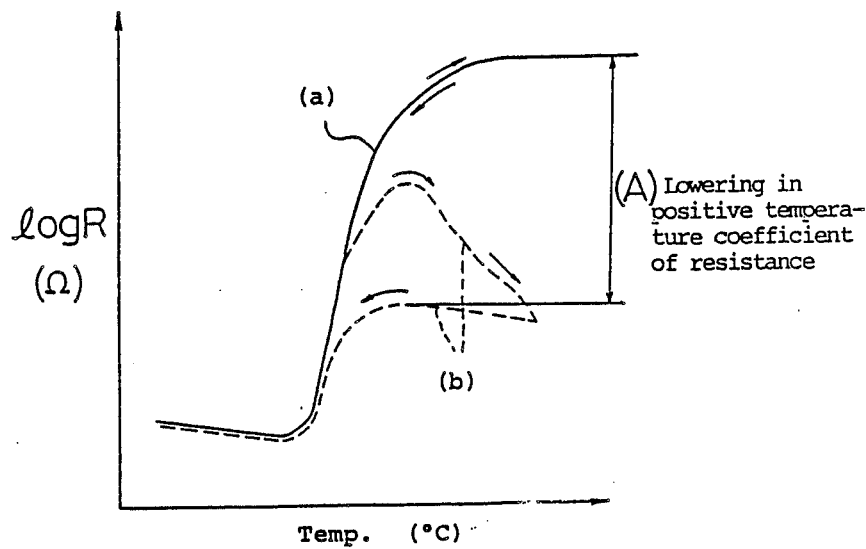
FIG. 11 is a graph showing a positive temperature coefficient of resistance lowered in sour gasoline.

Study of anti-reducing property in sour gasoline:

The procedures of EXAMPLE 1 were repeated for preparing 25 mm dia., 2.5 mm thick disks of positive coefficient semiconducting porcelain in accordance with the same recipes, and forming a Ni-Ag electrode on each side of each disk. The electric resistance of each disk was measured substantially continuously over a temperature range from the ambient temperature to 300° C. in the air. The results are shown by a solid-line curve (a) in FIG. 11. Then, each disk was subjected to an immersion voltage withstanding test. The test was conducted by immersing the disk in sour gasoline and applying a voltage of 30 V thereto for at least 200 hours. The sour gasoline is a type of gasoline which has been oxidized to form a peroxide or an acid, and which is used for an accelerated test. After the test had been over, the electric resistance of each disk was measured substantially continuously over a temperature range from the ambient temperature to 300° C. in the air. The results are shown by a broken-line curve (b) in FIG. 11. The difference which appears between the two curves as shown at (A) in FIG. 11 indicates a lowering or change made by the disk in its positive temperature coefficient of resistance. The specific numerical data on such change are given in TABLES 11 to 13. They were calculated by the following equation:

Change $(A) = \log (R' \max./R' \min.) - \log (R \max./R \min.)$ where R is the resistance measured before the withstanding test, R' is the resistance measured after the withstanding test, max. is the maximum value, and min. is the minimum value.

TABLES 11 to 13 do not show such data for certain samples, since no immersion voltage withstanding test was conducted on any porcelain having a resistivity exceeding 100 Ω.cm, as any such procelain fails to produce a sufficiently large amount of heat during such a test to provide reliable data. The evaluation marks, 'circle', 'triangle' and 'cross', in TABLES 11 to 13 indicate that the absolute value of (A) was up to 1, from 1 to 2, and over 2, respectively.

TABLES 11 to 13 confirm that Samples Nos. 18 to 22, 24 to 27, 29, 34 to 37, 39 to 41, 43, 44 and 49 to 51 of porcelain embodying this invention are definitely superior in anti-reducing property to the other samples (e.g., No. 17), as the logarithmic values showing their changes in positive temperature coefficient of resistance are from +0.1 to −0.9 as opposed to the value of −1.8 in the case of Sample No. 17. Among others, Samples Nos. 19 to 22, 24 to 27, 29, 35, 36, 39, 40 and 49 to 51, which are preferred examples of this invention and contain 0.2 to 0.4% by weight of Al$_2$O$_3$, 0.14 to 1.15% by weight of TiO$_2$, 0.2 to 0.8% by weight if SiO$_2$ and a lithium compound having a lithium content of 0.1 to 0.8 mol %, showed only a small change in positive temperature coefficient of resistance as indicated by a logarithmic value of +0.2 to −0.7, and a resistivity not exceeding 80 Ω.cm.

STUDY OF RESULTS OF EXAMPLES 1 AND 2

(1) Lithium compound:

Both Li$_2$CO$_3$ and Li$_2$O were substantially equally effective (compare Nos. 24 and 25, or Nos. 26 and 27).

(2) Proportions of flux constituents:

Porcelain containing 0.02, 0.05, 0.1, 0.3, 0.4 or 1.0 mo % of Li$_2$CO$_3$, or having a lithium content of 0.04, 0.1, 0.2, 0.6, 0.8 or 2.0 mol % (Nos. 18 to 23, respectively) showed an excellent anti-reducing property. Samples Nos. 19 to 22 having a lithium content of 0.1, 0.2, 0.6 and 0.8 mol %, respectively, were particularly good, as they showed a still smaller change in positive temperature coefficient of resistance and a resistivity which was lower than 80 Ω.cm. On the other hand, Sample No. 17 having a lithium content of 0.02 mol % was unsatisfactory in anti-reducing property in the presence of hydrogen and sour gasoline as shown by the 'triangle' mark in both cases in TABLE 11.

The porcelain containing 0.1% by weight of $Al_2O_3$ (Nos. 28 and 31 to 33) was low in anti-reducing property in the presence of hydrogen or sour gasoline as shown by the 'triangle' or 'cross' mark in TABLE 12.

TABLES 11 to 13 confirm the excellent anti-reducing property, in the presence of hydrogen or sour gasoline, of the samples of this invention containing 0.2 to 1.6% by weight of $Al_2O_3$, 0.14 to 2.88% by weight of $TiO_2$, 0.1 to 1.6% by weight of $SiO_2$ and a lithium compound having a lithium content of 0.04 to 2.0 mol % (Nos. 17 to 55, except Nos. 17, 28 and 31 to 33).

The porcelain containing only three flux constituents, $Al_2O_3$, $TiO_2$ and $SiO_2$, (e.g., No. 11 or 12) had its quality lowered by reduction at a Curie point exceeding 150° C. (e.g., 160° C. in the case of No. 11, or 180° C. in the case of No. 12). On the other hand, the porcelain of this invention (e.g., No. 24) was quite satisfactory in anti-reducing property even at a Curie point as high as 200° C., obviously due to the use of a lithium compound as the fourth flux constituent.

(3) Timing for lead addition:

In the event that positive coefficient semiconducting porcelain having a high curie point was produced, it was more effective to add PbO to form its solid solution With $BaTiO_3$ during calcining for reducing the scattering loss of lead, lowering the water absorbing capacity of the porcelain and improving its anti-reducing property, than to add $PbTiO_3$ after calcining (Nos. 13 to 15, 26 and 27 versus Nos. 10 to 12, 24 and 25).

EXAMPLE 3

Figure 12:
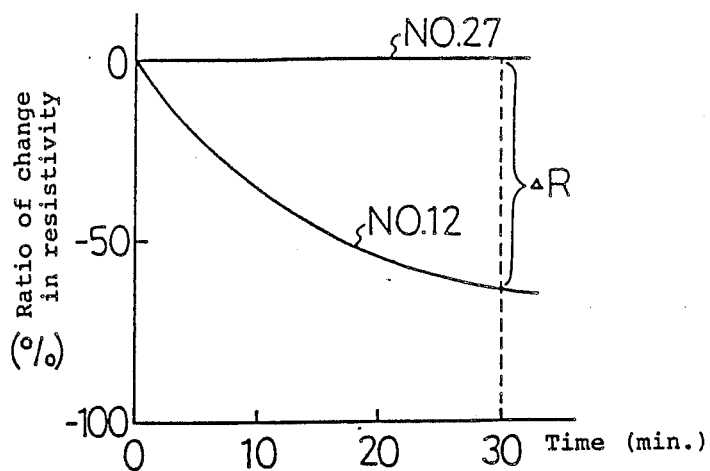
FIG. 12 is a graph showing changes of electric resistance in hydrogen gas.

The procedures of EXAMPLE 1 were repeated for preparing two 25 mm dia., 2.5 mm thick disks of positive coefficient semiconducting porcelain. One of them was identical to Sample No. 12 according to the prior art, and the other was identical to Sample No. 27 embodying this invention. A Ni-Ag electrode was formed on each side of each disk and each disk was left in a hydrogen gas atmosphere at 300° C. for 30 minutes. Its electric resistance was measured substantially continuously throughout the 30-minute period and a ratio of its change in resistance was studied based on the value obtained immediately after it had been placed in the atmosphere. The results are shown in FIG. 12. As is obvious from FIG. 12, Sample No. 12 prepared by employing three flux constituents, but having a higher degree of performance than any other known positive coefficient semiconducting porcelain showed a ratio $\Delta R$ of 68%, but Sample No. 27 embodying this invention showed a $\Delta R$ value of only 9.1%. Therefore, the porcelain of this invention has a very high anti-reducing property without showing any appreciable change in electric resistance even in the presence of hydrogen gas.

Although the reason for the improved anti-reducing property of the porcelain according to this invention is not clear, it is apparently partly due to its extremely low water absorbing capacity which owes itself to the flux composed of $Al_2O_3$, $TiO_2$, $SiO_2$ and a lithium compound, and which contributes to reducing the invasion of any reducing substance into the porcelain.

EXAMPLE 4

Figure 13:
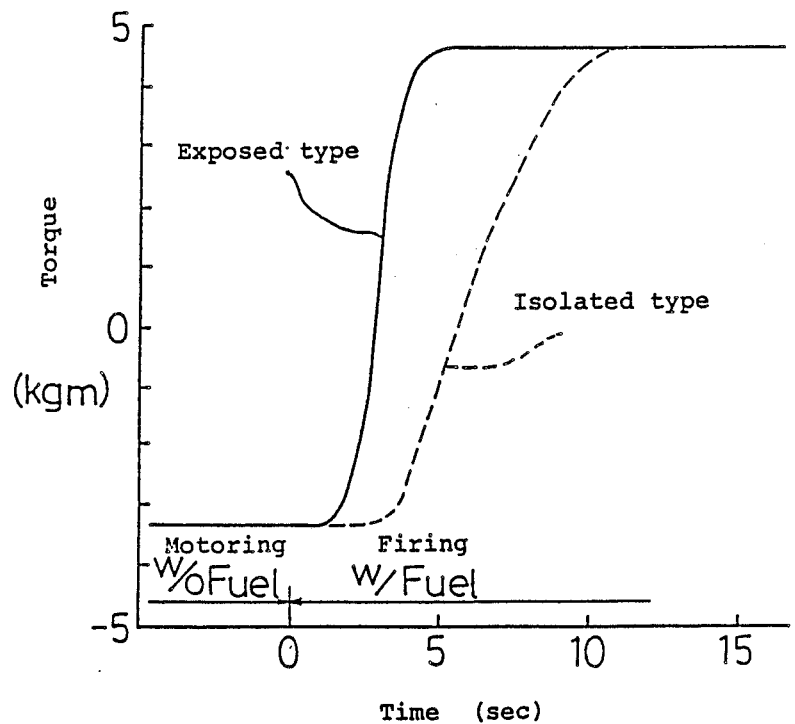
FIG. 13 is a graph showing the torque performance of engines.

Sample No. 24 of porcelain according to this invention was employed in a fuel-air heater for an engine in such a way that it might be exposed to the fuel-air mixture, as shown in FIG. 6, and also in a fuel-air heater for another engine in such a way that it might be isolated from the fuel-air mixture, as shown in FIG. 5. The two engines were compared with each other in torque performance. The conditions under which the engines were operated were: 1600 rpm (1500 cc), 4.5 kg.m, W/choke, A/F: 11 to 12. The results are shown in FIG. 13. The results confirm that the use of the exposed porcelain according to this invention contributes to improving the torque performance of the engine.

What is claimed is:

1. An internal combustion engine, having an air-fuel mixture intake passage provided with an air-fuel mixture heater disposed for heating air-fuel mixture flowing through said air-fuel mixture intake passage wherein:
   said heater comprises an anti-reducing semiconducting porcelain having a positive temperature coefficient of resistance, said porcelain being disposed for physical contact with said air-fuel mixture flowing in said air-fuel mixture intake passage;
   said porcelain comprising
   100 parts by weight of a barium titanate composition; and
   a flux composed of 0.14 to 2.88 parts by weight of $TiO_2$, 0.1 to 1.6 parts by weight of $Al_2O_3$ and 0.1 to 1.6 parts by weight of $SiO_2$.

2. A method for heating an air-fuel mixture for an internal combustion engine, comprising:
   providing an air-fuel mixture intake for the internal combustion engine with a heater which comprises an anti-reducing semiconducting porcelain having a positive temperature coefficient of resistance, said porcelain being disposed for physical contact with said air-fuel mixture flowing in said air-fuel mixture intake passage;
   said porcelain comprising
   100 parts by weight of a barium titanate composition; and
   a flux composed of 0.14 to 2.88 parts by weight of $TiO_2$, 0.1 to 1.6 parts by weight of $Al_2O_3$ and 0.1 to 1.6 parts by weight of $SiO_2$; and
   while electrically heating said porcelain, passing air-fuel mixture through said intake to said engine.

3. The internal combustion engine as set forth in claim 1, wherein said barium titanate composition is of the general formula $Ba_{1-x}M_x^3TiO_3$ or $BaTi_{1-y}M_y^5O_3$, where $M^3$ is a rare earth element, such as Y, La, Sm, Ce or Ga, $M^5$ is a transition element, such as Nb or Ta, x is from 0.001 to 0.005, and y is from 0.0005 to 0.005.

4. The internal combustion engine as set forth in claim 1, wherein said flux contains 0.2 to 1.6 parts by weight of said $Al_2O_3$, and further contains a zinc compound having a zinc content of 0.05 to 0.5 mol per 100 mols of said barium titanate composition.

5. The internal combustion engine, as set forth in claim 4, wherein said flux contains 0.2 to 0.4 parts by weight of said $Al_2O_3$, 0.14 to 1.15 parts by weight of said $TiO_2$ and 0.2 to 0.8 parts by weight of said $SiO_2$ per 100 parts by weight of said barium titanate composition, and said zinc compound having a zinc content of 0.05 to 0.2 mol per 100 mols of said barium titanate composition.

6. The internal combustion engine as set forth in claim 4, wherein said zinc compound is zinc oxide (ZnO).

7. The internal combustion engine as set forth in claim 4, wherein said barium titanate composition is of the general formula $Ba_{1-x}M_x^3TiO_3$ or $BaTi_{1-y}M_y^5O_3$, where $M^3$ is a rare earth element, such as Y, La, Sm, Ce or Ga, $M^5$ is a transition element, such as Nb or Ta, x is from 0.001 to 0.005, and y is from 0.0005 to 0.005.

8. The internal combustion engine as set forth in claim 1, wherein said flux contains 0.2 to 1.6 parts by weight of said $Al_2O_3$, and further contains a potassium compound having a potassium content of 0.01 to 0.6 mol per 100 mols of said barium titanate composition.

9. The internal combustion engine as set forth in claim 8, wherein said flux contains 0.2 to 0.4 parts by weight of said $Al_2O_3$, 0.14 to 1.15 parts by weight of said $TiO_3$ and 0.2 to 0.8 parts by weight of said $SiO_2$ per 100 parts by weight of said barium titanate composition, and said potassium compound having a potassium content of 0.01 to 0.2 mol per 100 mols of said barium titanate composition.

10. The internal combustion engine as set forth in claim 8, wherein said potassium compound is potassium oxide ($K_2O$).

11. The internal combustion engine as set forth in claim 8, wherein said barium titanate composition is of the general formula $Ba_{1-x}M_x^3TiO_3$ or $BaTi_{1-y}M_y^5O_3$, where $M^3$ is a rare earth element, such as Y, La, Sm, Ce or Ga, $M^5$ is a transition element, such as Nb or Ta, x is from 0.001 to 0.005, and y is from 0.0005 to 0.005.

12. The internal combustion engine as set forth in claim 1, wherein said flux contains 0.2 to 1.6 parts by weight of said $Al_2O_3$, and further contains a lithium compound having a lithium content of 0.04 to 2.0 mols per 100 mols of said barium titanate composition.

13. The internal combustion engine as set forth in claim 12, wherein said flux contains 0.2 to 0.4 part by weight of said $Al_2O_3$, 0.14 to 1.15 parts by weight of said $TiO_2$ and 0.2 to 0.8 part of $SiO_2$ per 100 parts by weight of said barium titanate composition, and said lithium compound having a lithium content of 0.1 to 0.8 mol per 100 mols of said barium titanate composition.

14. The internal combustion engine as set forth in claim 12, wherein said lithium compound is lithium oxide ($Li_2O$).

15. The internal combustion engine as set forth in claim 12, wherein said barium titanate composition is of the general formula $Ba_{1-x}M_x^3TiO_3$ or $BaTi_{1-y}M_y^5O_3$, where $M^3$ is a rare earth element, such as Y, La, Sm, Ce or Ga, $M^5$ is a transition element, such as Nb or Ta, x is from 0.001 to 0.005, and y is from 0.0005 to 0.005.

* * * * *